United States Patent
Bourbonnais et al.

(10) Patent No.: US 9,928,281 B2
(45) Date of Patent: Mar. 27, 2018

(54) LIGHTWEIGHT TABLE COMPARISON

(71) Applicant: International Business Machines Corporation, Armonk, NY (US)

(72) Inventors: Serge Bourbonnais, Palo Alto, CA (US); Yat On Lau, San Jose, CA (US); Xiao Li, San Jose, CA (US); Hong Min, Poughkeepsie, NY (US); Jonathan Wierenga, Lower Hutt (NZ); Xiang Wei Zhou, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 128 days.

(21) Appl. No.: 14/663,819

(22) Filed: Mar. 20, 2015

(65) Prior Publication Data

US 2016/0275150 A1    Sep. 22, 2016

(51) Int. Cl.
*G06F 17/30* (2006.01)

(52) U.S. Cl.
CPC .. *G06F 17/30536* (2013.01); *G06F 17/30528* (2013.01); *G06F 17/30557* (2013.01)

(58) Field of Classification Search
CPC ......... G06F 17/30536; G06F 17/30557; G06F 17/30528

(Continued)

(56) References Cited

U.S. PATENT DOCUMENTS 5,802,528 A    9/1998  Oki et al.
6,553,388 B1   4/2003  Perks (Continued)

FOREIGN PATENT DOCUMENTS

WO    WO 2014/049605 A1    4/2014

OTHER PUBLICATIONS

LEE et al., "Table-Comparison Prefetching in VIA-based Parallel File System", 42nd Annual Symposium on Foundations of Computer Science, (FOCS 2001) Las Vegas, Oct. 14-17, 2001, [Annual Symposium on Foundations of Computer Science], Los Alamitos, CA : IEEE Comp. Soc. US, Oct. 11, 2001 (Oct. 11, 2001), pp. 163-167, KP032234942.

(Continued)

*Primary Examiner* — Shahid Alam
(74) *Attorney, Agent, or Firm* — Scully, Scott, Murphy & Presser, P.C.; Rabin Bhattacharya

(57) ABSTRACT

A system, method and computer program product for enabling light weight table comparison with high-accuracy (high confidence) of tables where one is a copy of the other, which copy may be maintained synchronized by replication. The method performs database comparison using a sample-based, statistics-based, or materialized query tables-based approaches. The method first identifies a block comprising a sub-set of rows of data of a source database table and a corresponding block from a target database table, and obtains a statistical value associated with each block. Then the statistical values for the corresponding source and target block are compared and a consistency evaluation of source and target database is determined based on comparing results. Further methods enable a determination of the data as being persistent or not in manner that accounts for real-time data modifications to underlying source and target database tables while identified blocks are being compared.

20 Claims, 14 Drawing Sheets

(58) Field of Classification Search
USPC .......................................................... 707/769
See application file for complete search history.

(56) References Cited

U.S. PATENT DOCUMENTS

| | | | |
|---|---|---|---|
| 7,321,904 B2 | 1/2008 | Holenstein et al. | |
| 7,472,129 B2 | 12/2008 | Adya et al. | |
| 7,680,833 B1 | 3/2010 | Cole et al. | |
| 7,788,225 B2 | 8/2010 | Fish et al. | |
| 8,429,220 B2 * | 4/2013 | Wilkinson | G06F 17/30545 709/201 |
| 8,639,660 B1 | 1/2014 | Ou | |
| 8,805,783 B2 | 8/2014 | Muhunthan et al. | |
| 8,996,458 B2 | 3/2015 | Shang et al. | |
| 9,442,995 B2 | 9/2016 | Pareek et al. | |
| 2012/0296883 A1 | 11/2012 | Ganesh et al. | |
| 2012/0317134 A1 | 12/2012 | Bourbonnais et al. | |
| 2013/0013606 A1 * | 1/2013 | Stanfill | G06F 17/30297 707/737 |
| 2013/0067595 A1 | 3/2013 | Pierre et al. | |
| 2014/0236891 A1 | 8/2014 | Talius et al. | |
| 2014/0244148 A1 | 8/2014 | Horvitz et al. | |
| 2014/0372374 A1 | 12/2014 | Bourbonnais et al. | |

OTHER PUBLICATIONS

European Search Report dated Jun. 6, 2016.
Coehlo, "Remote Comparison of Database Tables", DBKDA 2011, The Third International Conference on Advances in Databases, Knowledge, and Data Applications, Jan. 23-28, 2011, St. Maarten, The Netherlands Antilles, pp. 23-28.
Dewitt et al., "Clustera: An Integrated Computation and Data Management System," Proceedings of the VLDB Endowment 1.1., Technical Report No. 1637, Apr. 2007.
Tang et al., "Performance of Database Synchronization Algorithms via Satellite," 2010 5th Advanced Satellite Multimedia Systems Conference and the 11th Signal Processing for Space Communications Workshop, IEEE, Sep. 13-15, 2010, pp. 455-461.

* cited by examiner

150

153　　155

13.42.33 Complete 43.3% Start 78.9% Comparison of block "11" is done (no difference, "8" common rows).
13.42.33 Complete 52.2% Start 91.1% Comparison of block "2" is done (no difference, "8" common rows).
13.42.36 Complete 61.1% Start 100.0% Comparison of block "6" is done.
　　　　"8" differences, "0" common rows
　　　　=> "8" rows that are unique to the source table
　　　　=> "0" rows that are unique to the target table
13.42.36 Complete 70.0% Start 100.0% Comparison of block "5" is done.
　　　　"8" differences, "0" common rows
　　　　=> "8" rows that are unique to the source table
　　　　=> "0" rows that are unique to the target table

| DIFF | DIFF_IS_PERSISTENT | CCRC | DIFF_TIME | BLOCK_NUM | ID |
|---|---|---|---|---|---|
| I | D | -3035519027515490304 | 2014-06-12-13.08.33.565492 | 1 | 2 |
| D | D | 3436323204 | 2014-06-12-13.08.33.565500 | 1 | 3 |
| U | D | -2594271244805052824 | 2014-06-12-13.08.33.565502 | 1 | 4 |
| D | D | 1534061675 | 2014-06-12-13.08.33.565504 | 1 | 5 |
| D | D | 3726578037 | 2014-06-12-13.08.33.565505 | 1 | 6 |
| N | U | 0 | 2014-06-12-13.08.33.565515 | 1 | - |
| I | C | -3035519027515490304 | 2014-06-12-13.08.34.587801 | 1 | 2 |
| D | C | 3436323204 | 2014-06-12-13.08.34.590650 | 1 | 3 |
| U | C | -2594271244805052824 | 2014-06-12-13.08.34.593813 | 1 | 4 |
| D | C | 1534061675 | 2014-06-12-13.08.34.596666 | 1 | 5 |
| D | C | 3726578037 | 2014-06-12-13.08.34.599462 | 1 | 6 |
| I | P | -3035519027515490304 | 2014-06-12-13.08.35.611307 | 1 | 2 |
| D | P | 3436323204 | 2014-06-12-13.08.35.612279 | 1 | 3 |
| U | P | -2594271244805052824 | 2014-06-12-13.08.35.613378 | 1 | 4 |
| D | P | 1534061675 | 2014-06-12-13.08.35.614298 | 1 | 5 |
| D | P | 3726578037 | 2014-06-12-13.08.35.615217 | 1 | 6 |

Num of total rows at source: 12.// number of rows in source by count(*)
Num differences　: 11. // number of total differences (including all DIFF_IS_PERSISTENT: T,U,P)
Num duplicated　: 1.　// number of duplicated differences
Num updates　　 : 1.　// number of updates (DIFF_TYPE=U)
Num source only : 7.　// number of source only　(DIFF_TYPE=I)
Num target only　: 3.　// number of target only　(DIFF_TYPE=D)
Num CS reads　　: 8.　// number of CS Reads
Num timeout　　 : 0.　// number of differences　(whose DIFF_PERSISTENCE is T)
Num temp　　　 : 0.　// number of differences that are not a persistent differences after recompares
Num persistent　: 8.　// number of differences　(whose DIFF_PERSISTENCE is P)
Num unknown　 : 3.　// number of differences　(whose DIFF_PERSISTENCE is U)
Num recompares : 0.　// number of re-compares (the number does not count the initial compares)

FIG. 14

LIGHTWEIGHT TABLE COMPARISON

BACKGROUND

The present invention related data replication, and particularly to methods and systems employed in database management systems for comparing data contained in a source database structure against a data replicated in a target database corresponding to the source database table, and identifying any differences.

Data replication is a common practice for an enterprise to ensure continuous data replication via data redundancy. From a technology prospective, there are disk based replication methodology as well as middle tier software based replication methodology. In terms of replication protocol, there are synchronous and asynchronous replication.

In asynchronous replication, the data is replicated after the transaction that originated the data changes is committed; hence it does not impact source site transaction performance. To validate if data is 100% replicated with accuracy, especially when asynchronous replication is applied, a data comparison utility is often used. For database, a comparison is performed to ensure that the data entries in source and (replication) target are consistent (matching) in terms of number of records for each key value and for each record column.

When the database table gets very large, and the two databases are physically remote from each other (e.g., at a distance), the comparison can be very expensive due to the cost of fetching data from tables, and sending the rows from one database to another for the compare. To reduce the amount of data transferred, a checksum of a record or multiple records may be transferred instead of the records themselves. Only when the check sum comparison fails to match, row comparison will be used.

Further, to improve the performance, parallel comparison can be used, and the check sums of a data block (multiple rows) are compared as validation. However parallel comparison only improves the elapse time of the comparison, it does not reduce the amount of work and hence can still be I/O and network intensive, as well as CPU consuming.

To many customers, it is highly desirable to reduce the cost of doing table difference comparison. This includes both the cost of the comparison, and the time spent in the comparison. In addition, the volume of data might be extremely large. In this case, the comparison must be such that resources do not become overwhelmed when this comparison takes place.

SUMMARY OF THE INVENTION

There exists a need in the art to provide for a light weight comparison with some level of accuracy instead of a row-by-row based examination (e.g., using raw data or checksum).

There additionally exists a need in the art to provide for a light weight comparison that includes tracking mechanisms for a live environment when updates to data at the source or target are assumed even while the data is being compared.

In this disclosure, a system and method and computer program product is provided for enabling light weight table comparison with high-accuracy (high confidence). Features of the disclosed light weight table comparison address the problem from the aspect of: 1) statistics based; 2) sample based; and 3) materialized query table (MQT)-based which MQT is a table whose definition is based upon the result of a query.

According to one aspect, there is provided a method of table data comparison. The method comprises: identifying a block comprising a sub-set of rows of data of a source database table, and a corresponding block comprising sub-set of rows of data of a second database table; obtaining a statistical value associated with data included in the identified block of the source table, and obtaining a further statistical value of the data included in the corresponding block of the target table block; comparing the statistical values to determine a matching result, and determining, based on a result of the comparing, whether the block of each source and target database table is consistent, wherein a programmed processor device performs the identifying, obtaining, comparing and determining operations.

According to a further aspect, there is provided a system for table data comparison. The system comprises: a memory configured to store data received from a source and a target database tables; a processor in communication with the memory, the processor configured to perform a method to: identify a block comprising a sub-set of rows of data of a source database table, and a corresponding block comprising sub-set of rows of data of a second database table; obtain a statistical value associated with data included in the identified block of the source table, and obtain a further statistical value of the data included in the corresponding block of the target table block; compare the statistical values to determine a matching result, and determine, based on a result of the comparing, whether the block of each source and target database table is consistent.

A computer program product is provided for performing operations. The computer program product includes a storage medium readable by a processing circuit and storing instructions run by the processing circuit for running a method(s). The method(s) are the same as listed above.

BRIEF DESCRIPTION OF THE DRAWINGS

The features and advantages of the present disclosure will become apparent from the following detailed description of illustrative embodiments thereof, which is to be read in connection with the accompanying drawings. In the drawings:

FIG. 12 shows an example output message indicating resulting completion statistics as a result of progress monitoring functions;

FIG. 13 shows an example difference detection output table showing the results of implementing the detailed procedures described herein; and FIG. 14 shows an example report configured to provide the totals of statistics in difference detection.

DETAILED DESCRIPTION OF THE INVENTION

Figure 1:
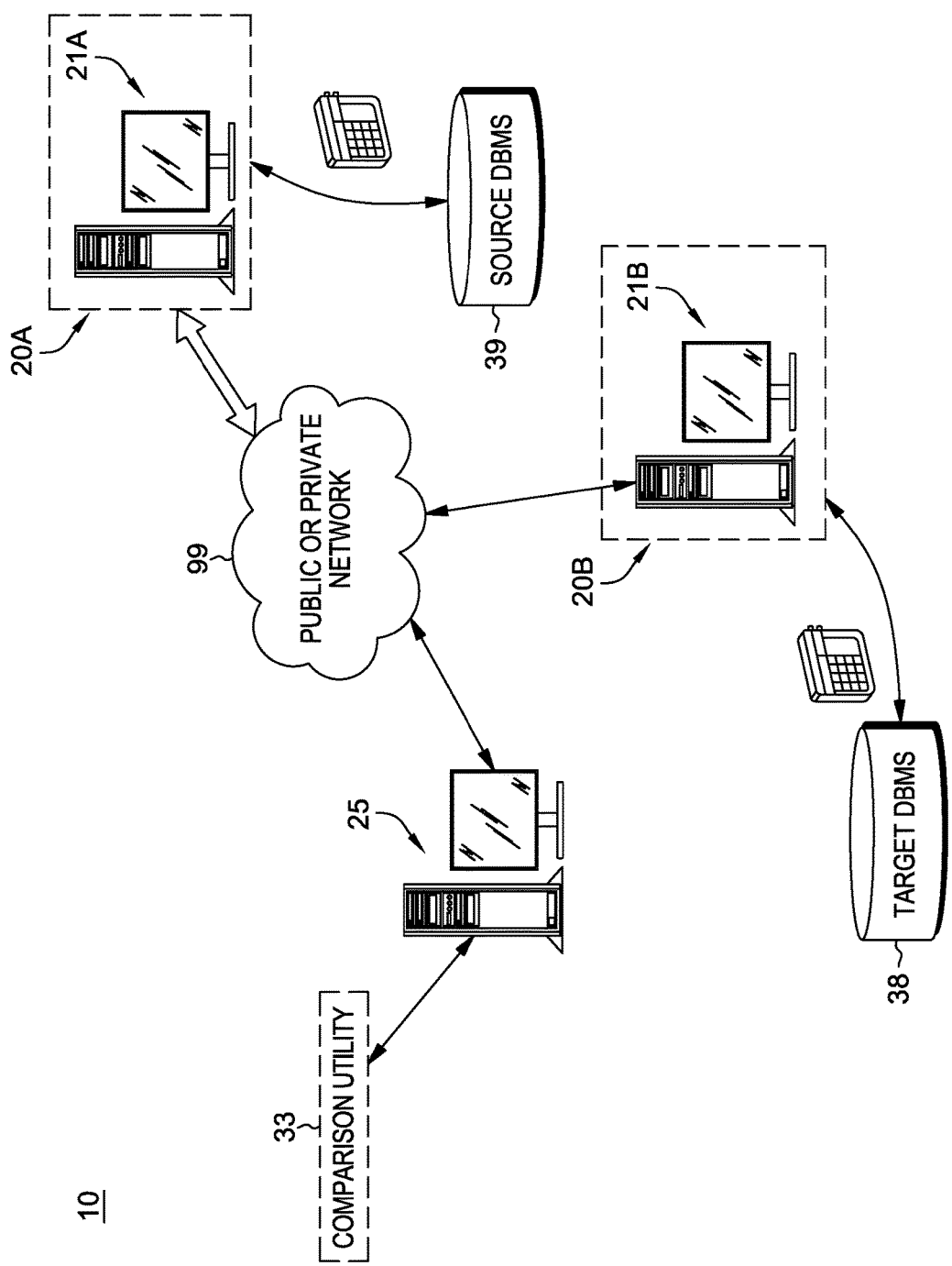
FIG. 1 depicts a conceptual block diagram showing a common data comparison infrastructure according to an embodiment.

The present disclosure will now be described in greater detail by referring to the following discussion and drawings that accompany the present application. The drawings of the present application, which are referred to herein below in greater detail, are provided for illustrative purposes.

A system, method and computer program product for providing lightweight table comparison is now described. Features of the system and method for light weight table comparison as described herein determine differences in Source and Target tables from the aspect of: 1) statistics; 2) samples; and/or a 3) materialized query table (MQT) which MQT is a table whose definition is based upon the result of a query.

In accordance with a further aspect, the system, method and computer program product for lightweight table comparison as now described further operates to detect for differences in corresponding source and target database table row entries in a "live" updates environment where the underlying source and/or target database tables are being updated while performing compare operations in order to discriminate a persistence type for particular rows having a detected difference. This may include features for performing a "re-checking" of database blocks, in parallel, having rows of data in source and target database table rows that have been determined as different.

Thus, in a first aspect, a comparing of "small" blocks is performed to compare data. The use of small blocks of data is a significant advantage when comparing "live" data, because data is read from both the source and target only when a pair of blocks is being compared, the probability of changes to the rows contained in those blocks is small. Any change to a block before its visited by a comparison utility is captured by the utility, any change that happens after the compare is finished for this block is not considered.

Thus, in a first aspect, a system and method for light weight table comparison is provided to determine differences in a Source (src) database table and Target (trgt) database tables from the aspect of: 1) statistics; 2) sampling; and/or a 3) materialized query table (MQT) which MQT is a table whose definition is based upon the result of a query.

In one aspect, the system and methods for lightweight table comparison implement a system infrastructure and operating environment for database table comparison by a "Merger" process in which the Merger process performs a database table comparison according to aforementioned systems and method described in as described in commonly-owned, co-pending U.S. Patent Publication No. 2012/0317134 entitled "Database Table Comparison" and U.S. Patent Publication No. US 2014/0372374 entitled "Difference Determination in a Database Environment", the whole disclosures and contents of each of which are incorporated by reference as if fully set forth herein.

In a further aspect, the system and methods for lightweight table comparison implements a modified system infrastructure and operating environment to perform a difference re-checking technique that ensures up to date determination of differences and their status with respect to persistence.

FIG. 1 depicts a conceptual block diagram showing a data comparison infrastructure 10 implementing the systems and methods according to one embodiment. The infrastructure includes a first source database (DBMS) 20A implementing first computing device, e.g., server 21A, and storing original data comprising the source database table 39. The source database system 20A is configured to provide data and compute checksums and the like for lightweight database table comparison purposes. Likewise, infrastructure 10 includes a second target database (DBMS) 20B implementing second computing device, e.g., server 21B, and storing data replicated from the source database in a target database table 38. The target database system 20A may be configured to respond to a comparison utility to provide corresponding data and compute corresponding checksums of the target database for lightweight database table comparison purposes. A comparison utility 33 implemented as a stored procedure in a further computing device 25, remote from the first two databases 38, 39 but in communication via a public or private communications network 99, is provided. In operation, the comparison utility 33 is configured to initiate a local fetching of the data in the source database 39 and initiate a local fetching of the corresponding data in the target database 38, receive the source and corresponding target data, perform the comparison of the data in a block contained in the source database 39 against the data in a corresponding block contained in the target database 39, and report the results. In one aspect, a lightweight database table comparison is performed by the comparison utility. It should be understood that, in alternate embodiments, the comparison utility is not necessarily remote from the source or target database, but may be run local at either source computing device 20A or target computing device 20B. Additionally, both source and target database may reside and share a single device.

Figure 2A:
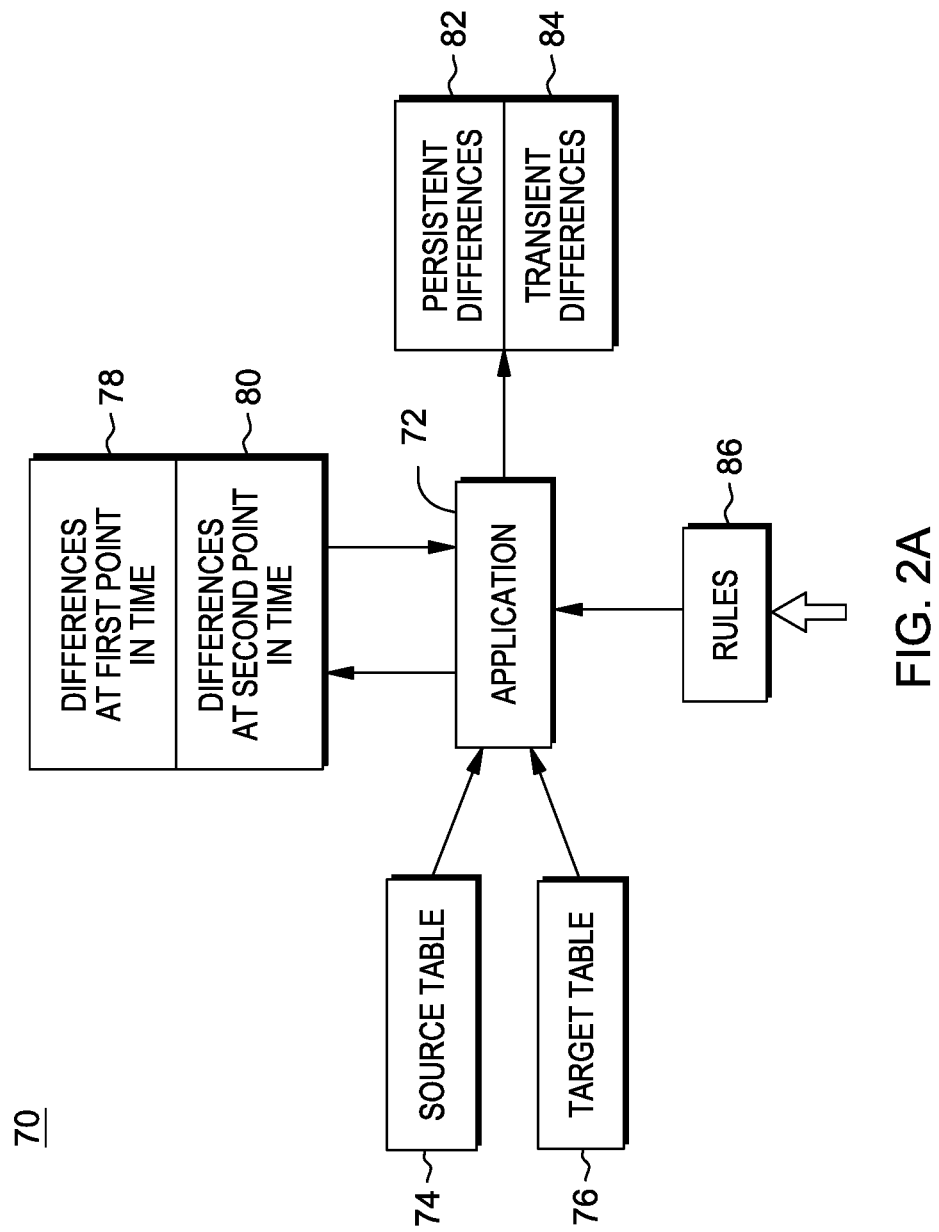
FIG. 2A is a data flow diagram illustrating an application configured to determine differences in a database environment, according to one embodiment presented in this disclosure.

FIG. 2A depicts a data flow diagram 70 depicting an application configured to determine differences in a database environment according to a light weight table comparison technique.

In FIG. 2A, a data flow diagram 70 illustrating an application 72 configured to determine differences in a database environment, according to one embodiment for light weight table comparison presented in this disclosure. As shown, the application 72 performs comparisons of a data in a source table 74 against data in a target table 76 at different points in time, which may be separated by at least a predefined interval such as a replication latency interval. Based on the comparisons, the application 72 determines differences 78 at a first point in time and differences 80 at a second point in time subsequent to the first point in time. Based on the differences 78, 80, the application 72 determines persistent differences 82 and/or transient differences 84 according to a set of predefined rules 86. The application 72 then outputs an indication of at least one persistent or transient difference. In some embodiments, the application 72 determines a set of tentative differences by filtering the differences 80 at the second point in time based on row-based checksums, including non-key and key values of the differences, and at least one difference in the set of tentative differences is subsequently determined to be a persistent difference or a transient difference. In some embodiments, several difference determinations between the source and target tables or blocks are used to distinguish between persistent differences and transient differences of the source and target tables. For instance, in one embodiment, at least one difference is determined to be a persistent difference or a transient difference based on the differences 80 at the second point in time and based further on differences at a third point in time subsequent to the second point in time.

In one embodiment, the techniques disclosed herein may be implemented within an architecture for a table comparison utility that permits updates to be made to the source or target tables during comparisons and that is configured to tell persistent and transient differences apart but that is nevertheless configured to efficiently compare tables or blocks separated by a WAN and regardless of table or block size. The table or block comparison utility, also referred to as a comparison utility, is a parallel utility that compares tables or blocks in three sequential stages including a preprocessing stage, a differencing stage, and a cleanup stage. The utility internally partitions the two tables and compares these partitions in parallel. Row retrieval for each partition pair occurs in parallel. The differences that are found in each partition pair are then combined to obtain the overall result.

Figure 2B:
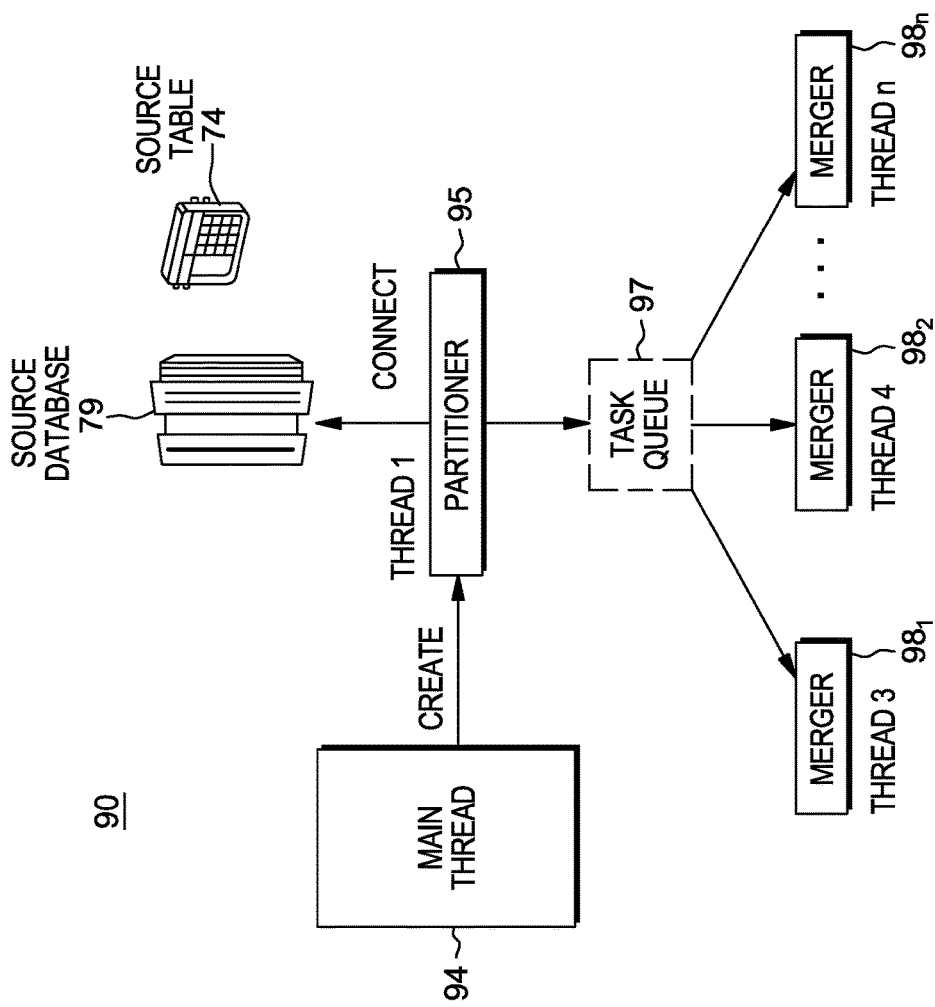
FIG. 2B is a diagram illustrating an application architecture for a table comparison utility, according to one embodiment presented in this disclosure.

FIG. 2B is a diagram illustrating an architecture 90 for the comparison utility, according to one embodiment. The comparison utility in the differencing stage includes a pool of cooperative threads including a main thread 94, a partitioner thread 96, merger threads 98.sub.1-n and worker threads, as discussed in greater detail below. In the differencing stage, the main thread 94 creates a partitioner thread 95, which splits the table comparison operation based on block-by column values and into smaller but similarly-sized sub-operations or tasks, each of which corresponds to a subset or partition of the source and target tables. The block-by columns are the indexed columns, which can be partitioning key, primary key or any column set. In this regard, the partitioner thread 95 selects the boundary block-by values for each partition from the source table 74, including minimum boundary block-by values and maximum boundary block-by values, where the source table 74 is stored in a source database 79. In one embodiment, the partition boundaries are determined as a function of the number of blocks of the source table 74 and the total number of rows in the source table 74. In another embodiment, the boundaries are determined as a function of the expected number of rows in a specific block and the row size of source table. The partitioner thread 95 uses the boundary block-by values to generate query statements to fetch specific partitions or blocks from the source and the target tables. The partitioner thread 95 then communicates the query statements to the merger threads 98 via a task queue 97. In accordance with one embodiment, a block table records block-specific statements which are processed by the Task Queue 97.

Figure 2C:
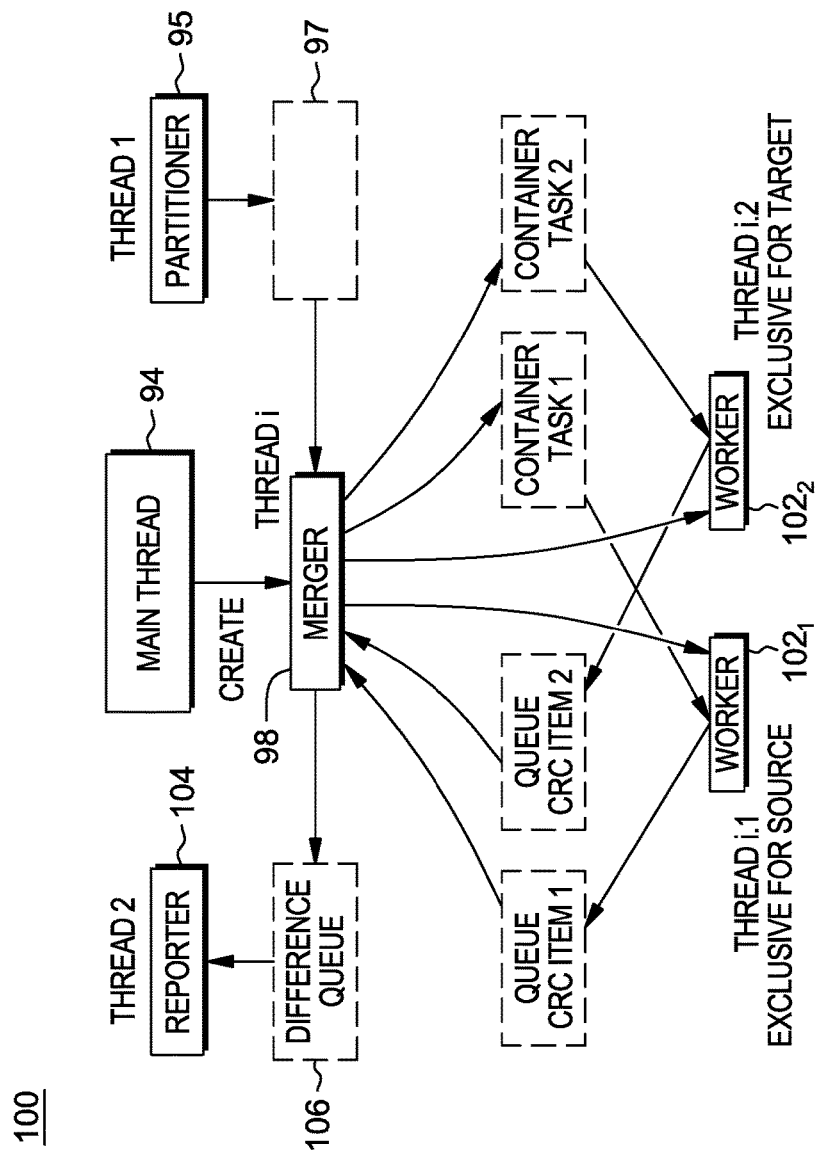
FIG. 2C is a diagram illustrating the application architecture for the table comparison utility, according to one embodiment presented in this disclosure.

FIG. 2C is a diagram illustrating the architecture 100 for the comparison utility, according to one embodiment presented in this disclosure. As stated above, the partitioner thread 95 distributes the query statements and associated partition comparison tasks to the merger threads 98 through the task queue during runtime and based on a predefined workload balancing policy or a pull model. The merger threads 98 identify differences from the respective partition comparison tasks. To that end, each merger thread 98 creates two worker threads $102_1, \ldots, 102_n$, including a worker thread that interacts with the source database exclusively and a worker thread that interacts with the target database exclusively. For each partition, the merger thread 98 assigns the corresponding query statement that describes the respective partition, to each of the worker threads 102 via a task container. The worker threads 102 then call a stored procedure on each of the source and target databases or directly fetch data from the source and target databases.

In one embodiment, the stored procedure is predefined and configured to return an aggregated checksum over the partition identified by the query statement. The aggregated checksum is also referred to herein as a composite checksum. The stored procedure receives the query statement as an input parameter and performs multi-row or block fetches against the database to extract all rows or a block within the identified partition. The stored procedure computes a respective row checksum for each row or block. The key values and checksums are inserted into a non-logged, global temporary table (GTT) instance associated with the calling worker thread 102. Further, the stored procedure calls a partition checksum function is to aggregate all the row-based checksums within the identified partition to a single checksum value. In some embodiments, the partition checksum is of a greater length than the row checksum. For example, in a particular embodiment, each row checksum is four bytes in length, while each partition checksum is eight bytes in length.

In one embodiment, if the two partition checksums match, the merger thread 98 regards the current partition as being consistent across the source and target tables and requests a next partition or block from the task queue. Otherwise, the merger thread 98 competes with the other merger threads for a permit for fetching from the global temporary table. After earning the permit, the merger thread 98 sends a merge request to the worker threads 102 to initiate a merge-compare sub-stage. During the merge-compare sub-stage, the two worker threads 102 working on the partition fetch the key and corresponding row-based checksum from the global temporary tables, sorted by key order, and pass them to the merger thread 98 via a checksum item queue. The merger thread 98 then performs a merge join on the key values to discover differences on a row-by-row or block-by-block basis, reporting any identified difference to a difference reporter thread 104 via a difference queue 106.

In another embodiment, the two worker threads 102 working on the partition fetch the all the columns from the source and target tables, sorted by key order, and calculate the corresponding row-based checksum, and pass them to the merger thread 98 via a checksum item queue without having to call the stored procedure. The merger thread 98 then performs a merge join on the key values to discover differences on a row-by-row or block-by-block basis, reporting any identified difference to a difference reporter thread 104 via a difference queue 106.

In one embodiment, the difference reporter thread 104, also referred to herein as a reporter thread, is configured to read discovered differences from the difference queue 106 and insert a difference entry into a differencing table, the difference entry containing a key value identifying a difference and a corresponding action, such as an insert, update, or delete, to correct the difference. In the cleanup stage, the comparison utility drops the definition of the global temporary tables from the database, if existing, and outputs a summary of the identified differences and completion statistics of each thread.

For exemplary and non-limiting purposes, the techniques disclosed for lightweight table comparison herein may be implemented by extending the architecture for the table comparison utility. The extended architecture may serve as a basis for the application. Such an application is also referred to herein as an in-flight comparison utility.

In one embodiment, the application generates or populates a difference table for each pair of source and target tables. Each record in the difference table is a difference entry and represents a row-specific difference between the source and target tables, where each row is identifiable by its key values. Each difference entry contains a set of key values, a difference flag, and a persistence flag. The set of key values refers to a set of attribute values that are the key values in both the source and target tables. Using the key values, corresponding rows in the source and target tables can be fetched. The difference flag specifies how a key-specific row is different between the source and target tables. The difference flag is selected from at least three difference flag types including update, insert, and delete—e.g., whether an update, insert, or delete operation would be required to correct the difference. The persistence flag is specifies whether the difference entry represents a persistent entry or a transient entry and is selected from at least four persistence flag types including persistent, non-persistent (transient), unknown and doubtful. The first three types are external to users. Doubtful, is an internal type for difference initialization.

In one embodiment, each comparison between two rows uses the result of the last comparison between the two rows in order to determine the persistence of any difference between the two rows. If updates are suspected to occur against the tables that are maintained by replication, the current comparison operation should be performed after the replication latency window has elapsed since the last comparison operation. Comparison results may be classified into three cases as follows. First, if the difference exists in both sets of results and the corresponding row are still the same, the difference is deemed to be persistent. Second, if the difference does not exist in the current comparison result, the difference is deemed to be transient. The difference may have been in-flight, rolled-back or repaired, depending on the embodiment. To free up storage space, these differences may be removed after the second compare. Third, if the difference exists in the current compare result or in both results, but their corresponding rows are different, then the difference is deemed to be of an unknown type and may be further determined in a subsequent comparison operation.

In one embodiment, the application, when configured according to the techniques herein, exhibits a set of properties including persistence identification, higher parallelism, lower overhead, and improved usability. As described above, the in-flight comparison utility determines the persistence of differences by using previously identified differences reflected in the differences table. In some embodiments, to more efficiently capture difference changes on key and non-key values, the application maintains a compare-based checksum (CCRC). In one embodiment, each CCRC value aggregates two row-based checksums from the source table and the target table, respectively. Accordingly, the column compare-based checksum may also be referred to as an aggregate checksum or composite checksum. To the extent that the CCRC exhibits uniqueness properties beyond those of a row checksum, the procedure of comparing two consecutive difference results may be simplified when comparing their CCRC values. In some embodiments, the application may also be configured with a predefined handler for checksum collisions on CCRC values. In one embodiment, CCRC is also recorded as a new column in the difference table.

Figure 2D:
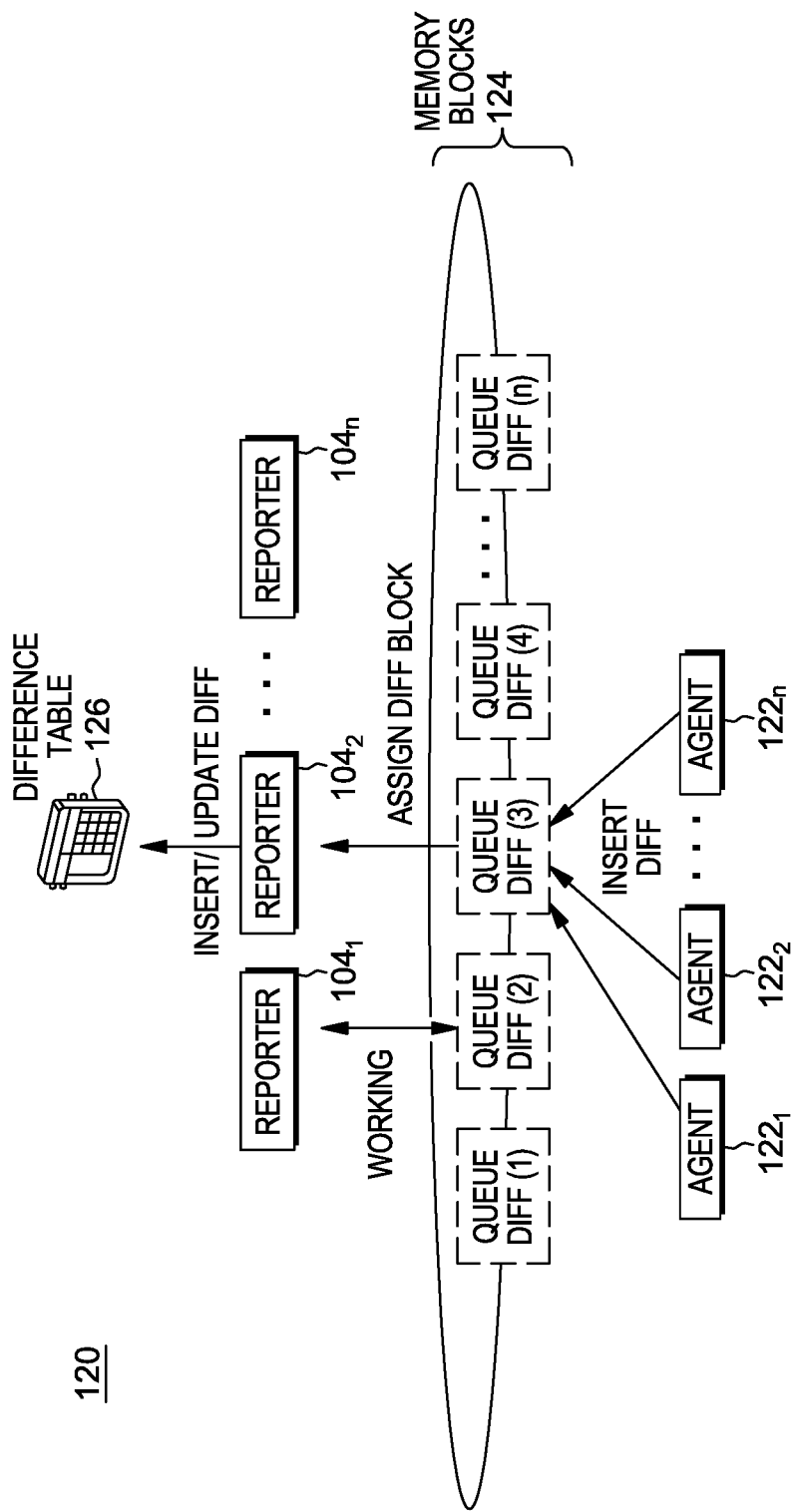
FIG. 2D is a diagram illustrating an application architecture for an inflight comparison utility, according to one embodiment presented in this disclosure.

FIG. 2D is a diagram illustrating an architecture 120 for the inflight comparison utility, according to one embodiment presented in this disclosure. In one embodiment, the merger threads can be regarded as agents $122_1, \ldots, 122_n$ configured to determine differences between respective blocks of the source and target tables. Similarly, the difference reporter thread may be regarded as a difference reporter agent, and likewise with other thread types disclosed herein. The determined differences are inserted as difference entries into a difference queue, whereafter the difference reporter thread processes the difference entries and records results in a difference table accordingly. In some embodiments, the comparison utility operates under an assumption that the source and target table have fewer than a threshold amount of differences, e.g., less than 0.01% differences. However, such an assumption may not hold true in an active/active environment, where the transient differences could be great in number. Accordingly, the architecture may be extended in one or more of the following ways. For example, rather than having a difference queue occupying only a single memory block, a difference queue is provided that has at least two rotating memory blocks 124, also referred to herein as queue diffs. When a difference reporter thread 104 is reading and processing the contents of a block, the merger threads should not make the content changes on the block until the difference reporter thread completes the processing of the entire block.

As another example, rather than having differences immediately reported to the difference reporter thread and then inserted individually, the differences may be batched based on a predefined grouping policy for thread coordination and difference insertion. In one embodiment, the merger threads notify the difference reporter thread that a given memory block for array insertion is ready for processing, upon determining that one of the following conditions is true: (i) one of the memory blocks 124 in the difference queue is full; (ii) one of the memory blocks 124 contains a specific number of differences within a particular time interval, e.g., the time interval corresponding to when the difference was identified; and (iii) the whole compare is completed. In one embodiment, each block can be directly used in a corresponding descriptor area that can be used in a multi-row insert by the difference reporting thread. A descriptor area refers to a collection of variables required for dynamic execution of an insert statement. One example of a descriptor area is a SQL descriptor area (SQLDA), which is a collection of variables required for execution of a SQL INSERT statement. Each variable describes a host variable array that represents a buffer that contains one or more values for a column of target table.

As a further example, rather than maintaining only the key values and associated actions as part of each difference entry in the difference table, the difference entries are augmented to include one or more of the following attributes for each: persistence type, compare-based checksum, and creation timestamp. In one embodiment, persistence types are determined by the difference reporter threads, while row-based checksums are determined by the merger threads.

In one embodiment, to improve comparison performance and to determine the persistence type for a reported difference, a CCRC to represent the compare result of a specific row. Given that each row in a block of either the source or target table can be identified by its key values, the key values are combined to generate a row-specific checksum value. Each CCRC is aggregated from two corresponding row-specific checksum values. The CCRCs may simplify comparison at least in some cases, e.g., in that only the CCRCs of the same key value from two different invocations of the inflight comparison utility are to be compared. If the checksums match, the difference is deemed persistent; otherwise, the difference is deemed transient.

In one embodiment, the application aggregates two row-based checksums into the CCRC using any of a variety of predefined techniques. For instance, a bitwise exclusive-or (XOR) may be used as an aggregation function. In order to calculate a CCRC, the source and target row-specific checksums should not match. If the checksums are identical, that means that the rows are not different from one another. Further, to the extent that the row-specific checksum values are uniformly distributed, the XOR-generated checksum values should be similarly distributed. Further still, though two distinct differences may have a CCRC collision, the application is configured to support handling of the collision.

The persistent difference identification for identifying difference persistence types under live update conditions occurring during database table compare operations will be discussed in greater detail herein below.

Figure 4A:
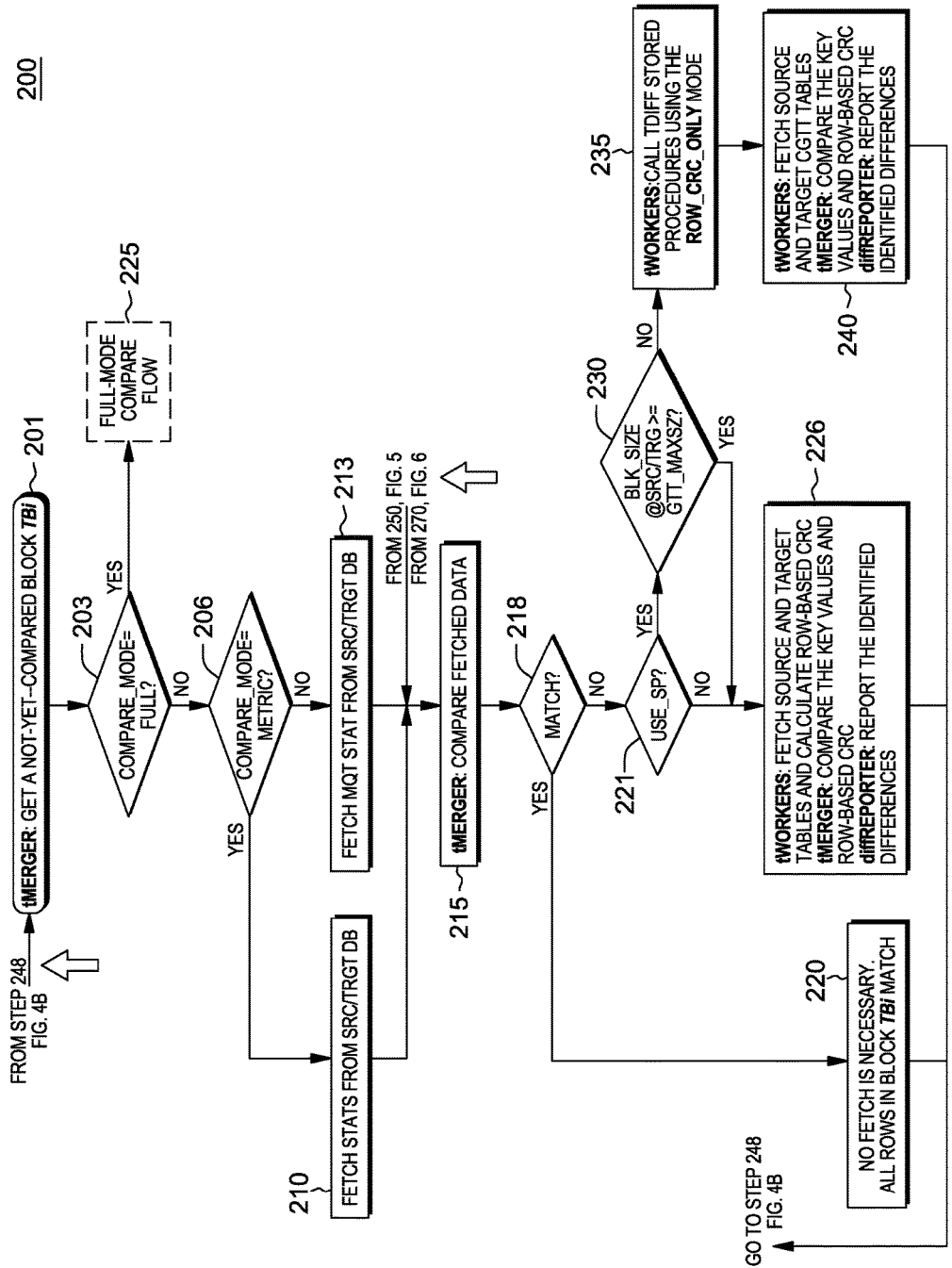
FIGS. 4A-4B depict the general processing for light-weight table comparison in one embodiment.
Figure 4B:
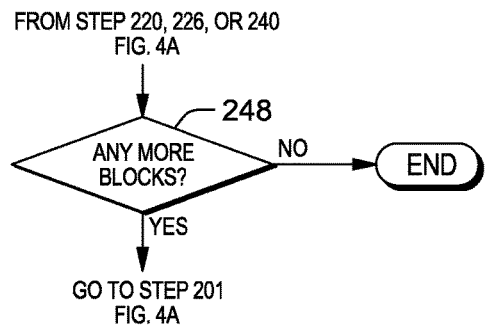

FIGS. 4A-4B depict the general processing for lightweight table comparison in one embodiment.

In particular, FIGS. 4A-4B depicts a method 200 implemented by a Merger thread operating in the differencing stage in the comparison utility 33 of FIG. 1 to perform a "light" weight table comparison in one embodiment. As shown in FIG. 4A, the method 200 described herein for light weight table comparison address the comparison from the aspect of using statistics, table sampling, MQT or combination of these aspects.

In the implementing of the method 200 by the Merger thread, it is assumed that a "COMPARE_MODE" switch variable for lightweight database table comparison mode has been set, e.g., by a user via an interface (e.g., graphic, command-line parameters or otherwise), to specify a light weight table comparison mode. For example, in one embodiment, the user may select a table comparison mode from the aspect of statistics in which case a COMPARE_MODE variable has been set to indicate "METRICS". Otherwise, the user may have alternatively selected a table comparison mode from the aspect of sampling in which case a COMPARE_MODE variable has been set to indicate "SAMPLE". Lastly, the user may alternatively select a table comparison mode from the aspect of MQT, in which case a COMPARE_MODE variable has been set to indicate MQT lightweight database table processing. In an alternate embodiment, a default setting may indicate a particular lightweight database table comparison mode.

Thus, for example, at 201 in FIG. 4A, the Merger thread obtains a not-yet-compared block TBi of the source database and at 203, a first determination is made as to whether the switch variable "COMPARE_MODE" has been pre-set by a user to indicate either FULL MODE which performs a full weight table comparison, or indicate a light weight table comparison mode, e.g., by statistics or sampling. If the COMPARE_MODE variable indicates a FULL mode table comparison, then the process proceeds to step 225 in which a full-mode database table row-by-row comparison is performed as known in the art. Otherwise, at step 203, if the COMPARE_MODE variable does not indicate a FULL comparison mode, then the process continues at 206 to make a determination as to whether a lightweight comparison mode by statistics has been selected. Thus, at step 206, a decision is made as to whether the switch variable "COMPARE_MODE" has been pre-set by a user to indicate a METRICS mode which performs light weight table comparison by use of computed database statistics values or other metric values of the compared blocks. If the COMPARE_MODE variable does indicate METRICS, then the process proceeds to step 210 in which a corresponding Worker thread is invoked for fetching a statistic of a block selected from the source and target database tables for lightweight table comparison according to a statistics comparison mode. Further details regarding a Partitioner thread fetching of statistics is described in greater detail with respect to FIG. 5.

After fetching the corresponding statistics from the corresponding blocks of the source and target database tables at 210, the process proceeds to step 215 where the Merger process performs the actual comparison of the statistic values of the corresponding blocks fetched from the source and target database tables. Otherwise, returning to 206, if it is determined that the switch variable "COMPARE_MODE" does not indicate METRICS, then the process continues at 213 for obtaining a corresponding MQT block selected from the source and target database tables for lightweight table comparison according to a MQT database table comparison mode after which, the process proceeds to step 215 where the Merger process performs the actual comparison of the source and target MQT tables. It should be understood that, in one embodiment, the "COMPARE_MODE" switch pre-set by the user could indicate a "MQT" lightweight table comparison mode, in which case a MQT lightweight database table comparison is performed. Further details regarding a Worker thread fetching of MQT data for comparison is described in greater detail with respect to FIG. 6.

Although not shown in FIG. 4A, in a further embodiment, a SAMPLING based solution is provided that can be integrated with either of the lightweight table comparison solution based on statistics or MQT. The SAMPLING based lightweight table comparison solution described herein can be further integrated with either of the solutions presented in herein incorporated, commonly-owned, co-pending U.S. Patent Publication No. 2012/0317134 and U.S. Patent Publication No. US 2014/0372374. Further details regarding a Worker thread sampling of rows from tables to form blocks for comparison, or to form blocks and corresponding statistics, for statistics comparison, is described in greater detail with respect to FIG. 7.

At 215, FIG. 4A, whether a corresponding fetched source and target MQT table is being compared, or whether a statistic corresponding source and target block is being compared or, whether a block of sampled rows of a corresponding source and target table are being compared, the process proceeds to step 218 to determine if the fetched statistics, fetched MQT tables or fetched sampled data from the respective source and target databases match.

As an example, in an embodiment, a statistics-based lightweight table comparison is performed on one or more corresponding blocks in corresponding source and target database tables. That is, a statistic associated with each block, is being compared. For example, a database provides a statistical value, or alternatively, a statistical value (not the actual data from the table) is calculated by a standard or user-defined function, associated with corresponding blocks from each source and target table and each statistical value is returned to the comparison utility for comparison at 218.

If at 218, it is determined that there is a match of the corresponding compared values, then the process continues and there is no need to fetch the data from the block as all rows from the source and target clock are deemed to match based on the compared data (e.g., statistic). As further blocks from the source and target tables may be compared for the lightweight table comparison, the process proceeds to step 248, FIG. 4B where a determination is made as to whether any more blocks are to be processed by lightweight table comparison by the Merger thread. If there is further blocks from the tables, then the process proceeds back to 201, FIG. 4A to repeat the processing for the next block. Otherwise, at 248, FIG. 4B if there are no more blocks to process, then the comparison utility ends or performs other processes.

Otherwise, if 218, it is determined that the fetched values (the statistics, MQT or sampled) obtained from the source and target database tables do not match, then the utility may report to a user, e.g., via a display, that the specific block that do not match in the source and target tables, or a boundary of the block or a range of rows that form a block, indicating a table difference, without reporting knowledge of any specific row. In a further embodiment, upon determining of no match at 218, FIG. 4A, the process proceeds to step 221 to determine whether a stored procedure (USE_SP) is to be invoked in which row-based checksums are calculated for block-specific comparison.

That is, at 221, if it is determined that no stored procedure is to be invoked, then the process proceeds to 226, for further row-based processing to determine and report any identified difference between the source and target table. This may entail at 226 having a Worker thread fetch source and target tables and calculate a row-based CRC for each which a Merger thread may compare and report any identified differences. Afterward, the process proceeds to 248, FIG. 4B to determine if there are any more blocks to process, in which case the process will proceed back to step 201, FIG. 4A if it is determined that there are further blocks to process from the tables. Then the comparison utility ends or performs other processes. Otherwise, at 248, FIG. 4B if there are no more blocks to process, then the comparison utility ends or performs other processes.

Otherwise, returning to 221, if the stored procedure is to be invoked, the process proceeds to 230 where a determination is made as to whether the resource usages (e.g., the global temporary table space size consumed by the invoked stored procedures) of the current block of the source/target tables might exceed a prior determined maximum size threshold "GTT_MAXSZ". The resource consumption, as used in the sampling-based embodiment to generate a block, could be large or small. However, if it is too large, it is desirable to limit and avoid use of the stored procedures for a very large block. Thus, at 230, if it is determined that the block size is greater than the "GTT_MAXSZ" threshold, the process proceeds to perform processing according to processes at 226. Otherwise, if the block size did not exceed the GTT_MAXSZ maximum threshold, then the stored-procedure is invoked at 235 where a Worker thread calls the stored procedure using the Row_CRC_Only mode, and at 240, fetching in stored non-logged Global Temporary Tables (GTT) a row-based checksums result set for which a Merger thread may compare the key values and row-based CRC and report of any identified differences. Afterward, the process proceeds to 248, FIG. 4B to determine if there are any more blocks to process, in which case the process will proceed back to step 201, FIG. 4A if it is determined that there are further blocks to process from the tables. Then the comparison utility ends or performs other processes. Otherwise, at 248, FIG. 4B if there are no more blocks to process, then the comparison utility ends or performs other processes.

In one embodiment, the reporting of identified differences at steps 226 and 240 includes the determination of a persistence status associated with the determined difference. In another embodiment, the first-time reporting of identified differences at steps 226 and 240 triggers the determination of a persistence status associated with the determined difference. To determine the persistence status of a difference, it might require multiple passes of method 200. In one embodiment, each difference is regarded as an individual block during a difference re-check stage. As will be described in further detail herein below, a difference re-check mechanism is provided in the determining of a detected difference's persistence status.

Figure 5:
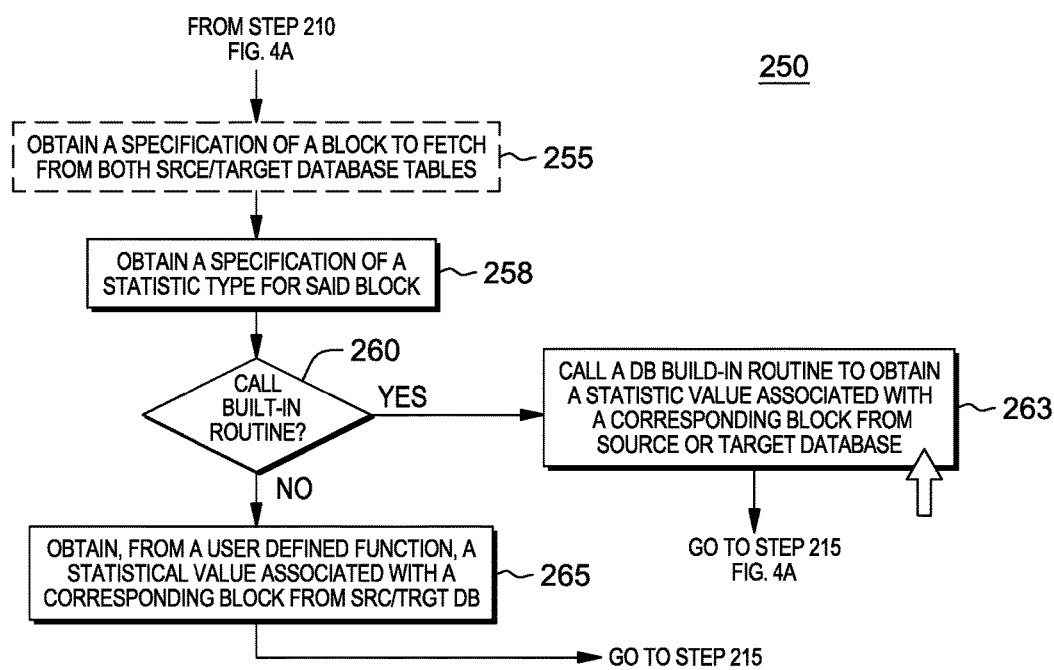
FIG. 5 depicts details for fetching statistics data for a corresponding block from the source table and target table databases for purposes of light weight table comparison in one embodiment.

Referring now to FIG. 5, there is depicted details of the method step 210 of FIG. 4A for fetching statistics data of a corresponding block from the source table and target table databases for purposes of light weight table comparison.

FIG. 5 depicts a method 250 implemented by operating Worker threads corresponding to the Merger thread for fetching statistics of corresponding blocks from the corresponding source database and target database tables for "light" weight table comparison in one embodiment. Each Merger thread has two Worker threads to fetch the statistics in parallel. One Worker thread is for the source table; another is for the target table.

As shown in FIG. 5, the method 250 addresses light weight table comparison from the aspect of statistics. In this embodiment, the statistics based table comparison is performed on a block by block basis. In a first step 255, the Worker thread obtains a specification of a block for performing the table comparison using statistics. In one embodiment, this block may be specified as a sub-set of the table, or the whole table itself. According to an embodiment of the disclosure, the fetched block may comprise a block of sampled rows and corresponding one or more columns obtained by a performed sampling technique discussed in greater detail herein below.

In one embodiment, a user may specify a block size, via an interface. Blocks may be generated at the time of table partitioning. For example, according to a sampling technique described below, a user may select a particular block size and then the utility can determine the average number of table rows per block based on the number of storage bytes per row. Block-by boundary values for that range of rows of that block are determined based on the selected amount of rows, and provided in a query statement generated to obtain the statistical value for the block. That is, select rows from each table may be sampled or range-based. The select rows (or columns) are aggregated to form one "block" from the database table. The "block" may include the whole table, but is typically select rows of the whole table.

Then, once the block is obtained, at 258, FIG. 5 there is performed obtaining a specification of a statistic type for the block of the table to be compared. In one embodiment, based on the specified statistic type, there is determined whether a built in function can be used to obtain the specified statistic. Thus, at 260, a decision is made whether to call a predetermined or built-in database routine for computing a statistic value for a block. For example, a statistical value for the block may be calculated at 263 by a standard function built into the database including, but not limited to: a table row count (cardinality), a column count, an average row length, and the row-based or column-based checksum functions. Alternately, or in addition, as indicated at 265, the statistical value may be calculated by a user-defined function. Whether obtained via a built-in database routine at 263 or obtained from a user defined function at 265, once the statistic values for the source block and target block are generated by the Merger thread, the process returns to step 215, FIG. 4A, where the obtained statistical values (e.g., table row count (cardinality), column count, average row length) of a corresponding block from each source and target table is ultimately compared by the Merger thread in the comparison utility.

In one embodiment, as part of a statistics-based approach for table comparison, at 263, the Worker process collects statistics that some database programs already collect, for example, table row count (cardinality), column count, average row length, etc. In this embodiment, instead of fetching rows from source and target tables, the comparison utility Worker thread issues SQL statements to the database. The values might be directly available in database's catalogue tables on both databases or the values can be generated/calculated based on the actual table data or index data. Then, the Merger thread compares the statistics of both the tables. In one embodiment, SQL statements may be oriented to obtain one or more of the above mentioned statistics (table row count (cardinality), column count, average row length, etc.).

Further, as some database programs already collect record-specific statistics such as cardinality and histogram statistics columns, keys cardinality, etc., at 263, the comparison utility Worker thread issues SQL statements to database's catalogue tables on both databases and the TMerger thread compares these cardinality and histogram statistics columns, keys cardinality statistics, from corresponding blocks from both source and target tables. In one embodiment, SQL statements may be oriented to obtain one or more of the above mentioned statistics.

In a further embodiment, at 263 or 265, FIG. 5, the comparison utility Worker thread may call a built-in statistical or metrics function(s) (e.g., MAX, MIN, AVG, SUM, VARIANCE and STDDEV), which built-in function may be pre-defined or a user-defined function, e.g., users can specify generating summary values on one or multiple columns. For example, such further statistics may include, but are not limited to: a specified average value generated on one or multiple columns of said block to table, a specified standard deviation value generated on one or multiple columns of said block to table, etc. These built-in statistical or user-defined functions can be used individually or combined. These statistics or summary values are then abstracted from a database object. For example, statistics or summary values may be obtained for a particular database, a particular set of "blocks", e.g., a table, or a particular sub-set of columns, or a particular range of rows. In one embodiment, each table is split into multiple blocks based on auto-determined column-value ranges. Each block has one or multiple summary/statistics value. In another embodiment, statistics/summary values may be generated through sampling methods as will be described in greater detail herein below.

Additionally, in a further embodiment, at 263, FIG. 5, the comparison utility Worker thread may call a built-in function(s) to obtain and account for runtime statistics or real time statistics. That is, the comparison utility may be programmed to record and receive a number of updates, inserts and deletes in the prior intervals for each database objects. Starting from a consistent initial state between both source and target tables, comparing real time statistics helps to detect inconsistency caused by data changes in a predetermined time interval, e.g., 10 seconds. Since there is delay in asynchronous data replication, such delay needs to be applied when identifying time window for comparison. A mechanism (e.g. such as a time token in a special purpose table) with difference re-checking is implemented by the Worker thread to resolve this as discussed in greater detail herein below.

The comparing of different statistics or summary values associated with each block of the table provides different level of insight and confidence in data consistency.

In a further embodiment, a MQT (materialized query table) based-approach for light-weight table comparison, is provided.

As known, in computing, a materialized view (MV or Materialized Query Table MQT), a database object is formed that contains the intermediate or final results of a query, e.g., a user query. For example, it may be a local copy of data located remotely, or it may be a subset of the rows and/or columns of a table or join result, or may be a summary based on aggregations of a table's data. The MV can be viewed as function mapping a result of a selected table. Thus, in one embodiment, a MV view (for an example Table 1) is viewed as according to:

MV(Table1)=func(Table_1);

or alternately, is viewed according to:

MV(Table1,Table2 . . . Table_$n$)=func(Table_1, Table_2 . . . Table_$n$), where function func can be such as aggregation functions such as sum( ), average( ), max( ), min( ), count( ), join (e.g., of multiple tables Table_1, Table_2 etc.). For example, the MV or MQT may be a merge or join of two or multiple tables. The MV or MQT is a separately stored table.

Some databases maintain materialized query tables to store pre-computed query or sub-query result in a separate table to speed up query processing. Very often, MQT tables store a result of aggregation of data from the base tables. Typically, there are mechanisms in a database to incrementally update MQT when data is updated, or refresh MQT table periodically.

MVs are updated/refreshed when its underlying source tables are updated. This is triggered and managed by database automatically in most DBMS (database management systems). For example, a database automatically refreshes and updates the MQT in response to any DELETE, INSERT, or UPDATE performed in the underlying tables. Thus, in one embodiment, the lightweight table comparison based on MQT requires an MQT for each to-be-compared table or each table block.

There are two independent aspects of utilizing MQTs in light weight table comparison.

1) The first aspect is defining a MQT as only a subset of the underlying table. The "subset" may be a projection of the original table on only a subset of table columns/attributes. The subset can also be a subset of rows or partitions.

Compared to full table comparison, such MQTs have smaller sizes than underline tables, and the comparison of source and target MQTs are less expensive in terms computation cost such as I/O, memory footprint and computation.

One non-limiting example of such definition of a materialized view query created to perform a full fledged compare over the whole source and target tables is as follows: In this example user query, it is assumed that the source database provides a row-based checksum function CHECKSUM(*). For an example source database table MQT_1_s creation:
Create MQT_1_s as (SELECT KEY_COL1, KEY_COL2, CHECKSUM(*) as ROW_CRC FROM SCH1.TAB1_SOURCE);
where KEY_COL1, KEY_COL2 are the column selections from a first table (TAB1_SOURCE). For the example target database table MQT_1_t creation:
Create MQT_1_t as SELECT KEY_COL1, KEY_COL2, CHECKSUM(*) as ROW_CRC FROM SCH2.TAB1_TARGET).
where KEY_COL1, KEY_COL2 are the column selections from a first table (TAB1_TARGET). The MQT refresh is handled in real time by existing RDBMS mechanisms.

2) The second aspect is to modify statistics based comparison by fetching a result of pre-defined MQTs, e.g., for the compare purpose only. The advantage of this is that, using MQT, one can define statistics functions that are tailored to application specific statistics, or more complex/comprehensive than what is provided by the RDBMS statistics catalog.

One non-limiting example of such definition of MQT tables defined by a user for use as a statistics-based compare over a specific block or a whole table, the materialized queries are as follows: for the source database table:
Create MQT_2_s as (SELECT COUNT(*) as ROW_COUNT, SUM(COL1) as SUM_COL1 FROM SCH1.TAB1_SOURCE);
where a row summation statistic function SELECT COUNT(*) dictating an amount of rows (COUNT(*)), is implemented; and for the target database table:
Create MQT_2_t as SELECT COUNT(*) as ROW_COUNT, SUM(COL1) as SUM_COL1 FROM SCH2.TAB1_TARGET.

After introduction of MQT, the table compare utility can do a row-by-row compare between two corresponding MQT tables, instead of fetching tables and calculating row-based checksums. If the contents of MQT table do not match, the compare utility can use a regular compare solution for a specific row or a specific block or a whole table without MQT.

Both of the MQT and RDBMS statistics can be refreshed at real time by existing RDBMS mechanisms. Thus, the MQT-based solution is different in that an MQT table can store the result sets of a query and they can be refreshed immediately when any change happens. The changes made to the underlying tables, e.g., as part of a DELETE, INSERT, or UPDATE table operation are cascaded to the materialized query table. For table comparison, an MQT for each to-be-compared table or each table block is required.

Figure 6:
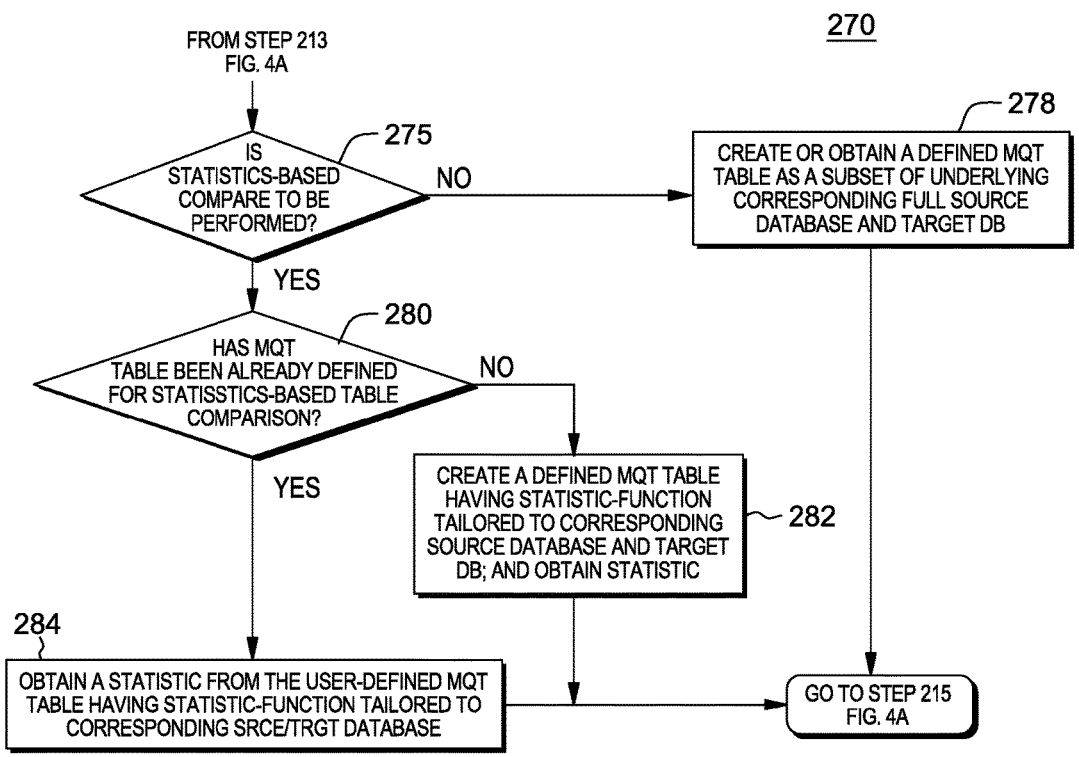
FIG. 6 depicts one embodiment of a method flow for fetching data from an MQT table for performing the light weight table comparison in one embodiment.

FIG. 6 depicts one embodiment of a method flow 270 for the data fetching step 213 of FIG. 4A for performing the table comparison using an MQT (materialized query table) in one embodiment. In one embodiment, the MQT-based solutions can be used in the sampling-based solution or statistics-based solutions, or the original full-mode compare solutions. The method defines and creates MQTs by the data comparison tool. As it is possible that users already have similar MQTs already defined for an application/query purpose, the methods herein are applicable to and do not exclude the use of those user-defined MQTs in place of the comparison tool defined MQT.

In one embodiment, the MQT-based table comparison is performed on a table-by-table basis. Thus, in one embodiment, there is determined at 275, FIG. 6, whether there is a specification of a particular statistic associated with the source MQT and a statistic associated with the target MQT may to be compared for lightweight table comparison. If there is no statistics-based compare to be performed as determined at 275, the process proceeds to 278 where an MQT table defined as a subset of underlying corresponding full source database and target DB is created or retrieved. For example, this step may specify or obtain the above-described MQT_1_s and MQT_1_t tables. Then the process proceeds back to step 215, FIG. 4A for the Merger thread to perform an actual lightweight table-based comparison of the source MQT table and the target MQT table.

Returning to step 275, FIG. 6, if is determined that there is a specification of a particular statistic-based comparison, the process proceeds to step 280 to determine whether an existing or user-defined MQT table been already defined for statistics-based table comparison. If no prior user-defined MQT table has been defined, the process proceeds to step 282 where there is created or obtained a defined MQT table having statistic-function tailored to corresponding to a particular block from source and target tables or the whole source database and target database. Then, a statistic from the source/target MQT tables may be obtained for comparison. Otherwise, at 284, FIG. 6, there is retrieved a statistic according to the select rows/columns of the user-defined MQT source/target tables having statistic-function tailored to corresponding srce/trgt database. For example statistics-based compare over a whole table includes the above-described materialized queries MQT_2_s and MQT_2_t. In another example, a MQT table stores the total sum and count of a column of rows for each key value in MQT on both source and target database. The Merger thread of the comparison utility compares the content of MQT.

In either event, once the statistic is obtained for the source and target database MQT tables, then the process proceeds back to step 215, FIG. 4A to perform the statistics-based table comparison. This may invoke statistics-based table comparison processing such as described herein with respect to FIG. 4A.

In connection with sampling, an MQT can even be built on top of a SAMPLING of rows within a table, which can therefore be used as a pre-computed summary table of the original table. In one embodiment, each row can correspond to a specific range of key column values.

In a further embodiment, a sample-based approach for light-weight table comparison is presented. In one embodiment, a sampling-based table partitioning solution is provided. In the context of lightweight table comparison, sampling is implemented to determine which tables and which subset of a table need to be compared. The sampling-based approach can be one of: row-based, column-based, range-based, block-based, page-based, partition-based, table-based, tablespace-based, or database-based.

In the known framework of herein incorporated US 20140372374 and US US20120317134, and as mentioned above, the Partitioner is the thread that scans table and generates blocks for Mergers. The generated blocks will be inserted into a queue, called taskQueue. Merger threads only compare the blocks that are available in taskQueue. In one embodiment, when sampling is used, the Partitioner will only randomly pick up a few blocks and insert these blocks to taskQueue, instead of generating/inserting all the blocks. In another embodiment, when sampling is used, Partitioner will generate blocks that consist of randomly selected rows.

Thus, when generating the block-specific SELECT statements, the method may also randomly select which columns are compared. There is thus no need to compare all the columns for all the blocks.

When each block contains one and only one row, it is row-based sampling.

When each block corresponds to a whole table partition, it is partition-based sampling. Or, when a partition is selected, there can be generated multiple smaller blocks for this selected partition.

In one embodiment, the selection rules can be: 1) completely random, and in one embodiment, is based on a condition formula:

$$rand( )>sample\_rate$$

where sample_rate is a pre-defined value specified by users or pre-determined by a machine; 2) completely random on the previously un-compared blocks, i.e., in this embodiment, there is a need to record which blocks have been compared in the previous compare history; 3) sampling may also be achieved by pre-computing row numbers, and then selecting every nth row, an equivalent subset; 4) sample selection criteria can be random, by distribution (histogram), preferred sequence or key values, time based (more recently updated table segment), round-robin-based, etc.; or 5) In one embodiment, some DBMS engines include the ability to specify only a sample of possible rows at the bottom of the query tree. For example DB2 LUW includes a TABLESAMPLE function, which allows one to either specify a sampling probability using row-level Bernoulli sampling or system page-level sampling.

In the sampling-based lightweight table comparison approach, instead of comparing all the records in a table or all the columns of a table, a sampling of table data is used. Sampling largely reduces costs in the following two aspects: 1) It only accesses a subset of table records and reduces the amount of subsequent data processes; 2) Certain sampling option issues SQL statement that is cheaper to execute than full comparison SQL statement. For example, a "Select count(*)" statement (e.g., fetch records only for counting) can be cheaper than "select *" (select all) statement in terms of CPU time because less data needs to be passed at the higher level of the runtime stack (interface) and hence shorter instruction path length.

Thus, in one aspect, rather than the table partitioning performs sorting and fetching of all the rows from the table for the corresponding columns, instead, in the embodiments herein, the method performs sorting and fetching of sample rows and uses the sample rows to determine the boundaries of each block.

Figure 7:
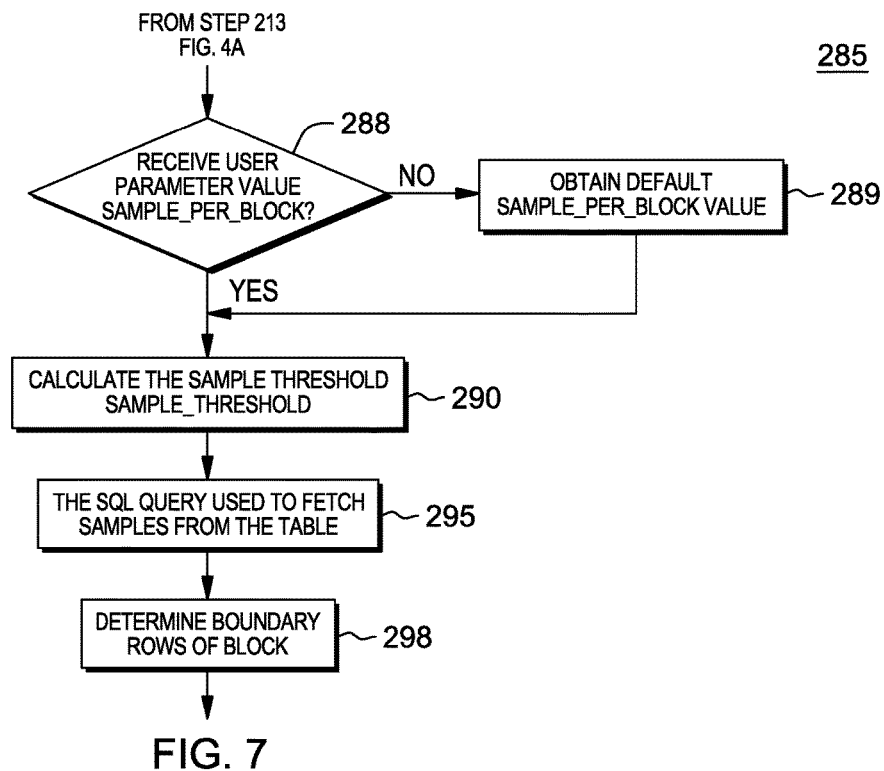
FIG. 7 depicts one aspect of a sampling-based lightweight table comparison approach in one embodiment.

FIG. 7 depicts one aspect of a sampling-based lightweight table comparison method 285 in one embodiment. The use of sampling to obtain blocks as shown in FIG. 7, entails obtaining a sample set in order to get boundary values, a sampling rate and random function to obtain a desired size of the block. After obtaining boundary values, SQL statements are generated to fetch the blocks from the source and target databases.

As shown in FIG. 7, the sampling-based method 285 to form blocks for lightweight table comparison includes a first step 288 depicted as determining whether a table partitioning thread has received SAMPLE_PER_BLOCK parameter value representing a user-specified number of sample rows per block. If a received parameter for SAMPLE_PER_BLOCK was user-defined, then the process proceeds to step 290. Otherwise, if there was no user-defined SAMPLE_PER_BLOCK parameter value received, the system obtains a default SAMPLE_PER_BLOCK parameter value at 289, and then proceeds to step 290. In one embodiment, a default SAMPLE_PER_BLOCK block value is 50.

At step 290, FIG. 7, from the SAMPLE_PER_BLOCK parameter value, there is derived a sample threshold SAMPLE_THRESHOLD value according to:

$$SAMPLE\_THRESHOLD=\max(\min(\max\_sample\_threshold,SAMPLE\_PER\_BLOCK/num\_rows\_per\_block),\min\_sample\_threshold)$$

where num_rows_per_block, max_sample_threshold and min_sample_threshold are values determined/adjusted by and received from programs or specified by users.

Then, at step 295, FIG. 7, there is generated an SQL query used to fetch samples from the table to form the block. In one example embodiment, an SQL query generated for sorting and fetching rows may be:
SELECT BLOCK_BY_COL1, BLOCK_BY_COL2 FROM SOURCE_TAB WHERE RAND( )<SAMPLE_THRESHOLD ORDER BY 1, 2 where, the RAND( ) function returns a random floating-point value between 0 and 1. Given a non-zero value of SAMPLE_PER_BLOCK, SAMPLE_THRESHOLD is a floating value between 0.00001 and 1. For example, a DBMS engine provides built-in random value generation functions (e.g. DB2 z/OS) provides RAND( ), which returns a random floating-point value between 0 and 1. For example, the following query will return about 1% rows of the whole table by random selection:
SELECT BLOCK_BY_COL1, BLOCK_BY_COL2 FROM TABLE1 WHERE RAND( )<0.01 ORDER BY 1.

Then, at 398, FIG. 7, based on the sample threshold, there is determined which rows should be used for the boundary rows of a block. The $(n-1)^{th}$ boundary cut and $n^{th}$ boundary cut can be used to form the $n^{th}$ block. The row number of the $n^{th}$ boundary cut in the whole query result set is equal to:

$$n*SAMPLE\_THRESHOLD*num\_rows\_per\_block$$

Thus, with respect to block generation, fetching all the block-by values is very expensive especially when the number of rows is huge and the total length of block-by columns is not small. For reducing the CPU time and elapsed time, sampling is used in key-value retrieval. Instead of fetching all the block-by column values, table partitioning thread only fetches a subset of rows, which are called samples. Users can control the expected number of samples per block by a hidden parameter SAMPLE_PER_BLOCK. The blocks are obtained based on sampling.

In further embodiments, sample selection criteria can be random, by distribution (e.g., histogram), a preferred sequence or key values, time based (e.g., more recently updated table segment), round-robin-based, etc. In one embodiment, some DBMS engines include the ability to specify only a sample of possible rows at the bottom of the query tree. For example DB2 LUW includes a TABLESAMPLE function, which allows a user to either specify a sampling probability using row-level Bernoulli sampling or system page-level sampling.

In another embodiment, sampling may also be achieved through On-line Analytical Processing (OLAP) functions, by pre-computing row numbers, and selecting every nth row, an equivalent subset.

It is understood that, in one aspect, the described three different light weight table comparison techniques can be used individually or combined, for example, combining statistics based light weight comparison of tables and data sampling for large table partition.

When light weight comparison reports inconsistency, a full-bloom comparison can be used to detect anomaly. In one embodiment, when the summary/statistics values of a sampled database object do not match, the comparison is started on raw data of the specific database object for determining which row/column is different.

Difference Re-Checking

As mentioned, Merger threads are the actual agents that are responsible for discovering the difference between source and target tables. All these discovered differences are inserted into the in-memory queue QueueDiff. The diffReporter threads process the differences and then records the results in the DIFF table.

In one aspect, lightweight table comparison employs a live comparison utility that extends the IBM Infosphere® comparison (ASNTDIFF) utility of their herein-incorporated co-pending applications to compare two tables that are being actively updated, and then to re-compare any detected differences in a block to account for replication latency and online changes to the data that might have occurred while the block was being compared. Data that is identical when a block is compared is not revisited.

Because data is read from both the source and target only when a pair of blocks is being compared, the probability of changes to the rows that are contained in those blocks is reduced. Any change that occurs before the compare utility visits the pair of blocks is included in the comparison; any change that happens after the comparison is finished for a set of blocks is not considered.

A difference is considered to be persistent if the data is still different when it is rechecked after the replication delay, and the difference was not initially caused by uncommitted transactions when the data was first compared.

Thus, the highly scalable table-compare utility for comparing very large tables separated by a wide area network is configured to assume that updates are made to the source and target tables during the compare. Thus, the utility is capable of detecting the persistent differences as opposed to transient differences caused by the asynchronously replication process latency. In a parallel mode, this method includes partitioning each table into blocks of rows that are either: 1) generated per sampling technique described herein; 2) delimited by a value range of block-by columns; or 3) rows from the source and target tables for a block range are compared independently from the rows of the other blocks. Thus, multiple block compares are performed in parallel. In one embodiment, the method performs determining the optimal number of rows in a block, by taking row size into account. Further, in one embodiment, the number of blocks is determined by the table size. A block is identified by the block-by column values for the first and last row in the range for this block or the boundary rows of continuous blocks. As described herein above, pairs of blocks are scheduled for comparison on a queue that is serviced by a pool of Merger threads. Each Merger compares one pair of blocks at a time.

In one embodiment, the method performs re-comparing any detected differences in a block to account for replication latency and online changes to the data while this block is being compared. Data that is identical when a block is compared is not revisited. Likewise, for the entire table, once two rows have been determined to be identical, they are not re-compared.

Comparing small blocks is a significant advantage when comparing live data. Because data is read from both the source and target only when a pair of blocks is being compared, the probability of changes to the rows contained in those blocks is reduced. Any change before the comparison utility visits this pair is included in the compare, any change that happens after the compare is finished for this block is not considered.

As will be referred to herein, the following definitions are provided:

DOUBTFUL (D): The difference could be persistent or not persistent. This is initial persistence type when a difference is identified after the first compare.

UNKNOWN (U): The difference could be persistent or not persistent. In live-mode comparisons, if the difference is not persistent, the only possible cause is a long-committed transaction or the data fetching using cursor stability (CS) (or higher isolations) is prohibited.

TIMEOUT (T): The difference could be persistent or not persistent. The limit of re-comparisons was reached and the rows are still different because the same row s (i.e., the rows with the same key values) keep being updated or not committed. The limit of comparisons is controlled by the RETRY_COMPARE parameter.

PERSISTENT (P): The difference is persistent. The data is still different when re-checked after the replication delay and the difference was not initially caused by uncommitted transactions when the data was first compared.

RETRY_COMPARE_WAIT=minimum_wait_in_seconds: An external parameter specifying a value that is larger than the sum of the estimated maximum end-to-end latency and the time of longest-running transaction that contains tables that are being compared in the environment. The comparison utility uses this value to determine when to re-compare a difference, allowing enough time for the change to be replicated. That is, the replication latency (END2END_LATENCY) can be estimated in a certain time window (MONITOR_TIME) and the latency can be used for determining the value of RETRY_COMPARE_WAIT (See FIG. 8).

If the utility re-compares a difference before it has been replicated to the target, a false difference might be reported. In one aspect, the utility may be rerun to compare only the differences from a previous comparison. In one example, the default value of RETRY_COMPARE_WAIT is 2 and the minimum value is 1.

RETRY_COMPARE=num_retries: An external parameter specifying how many times the utility re-compares rows that keep changing before giving up. If the limit of comparisons is reached and the rows are still different because the same rows keep being updated, the difference is reported as T (timed-out comparison) in the DIFF table. In one example, the default value is 1 and the minimum value is 0.

In one embodiment, the comparison utility uses an uncommitted read (UR) isolation level for querying data to avoid contention for locks with user applications. In this mode, uncommitted data is returned; this data might be rolled back, so the comparison utility does not include differences detected in UR mode. Differences are re-checked using cursor stability (CS) or higher isolations to ensure that rolled back data and in-flight transactions are not included in the final comparison. Cursor Stability mode is an isolation level which allows a shared lock to be placed on a fetched row, such that the shared lock is released when another row is fetched or the cursor is closed. Another process is permitted to place a shared lock on the same row, but no process is permitted to acquire an exclusive lock to modify data in the row.

If the compare utility is not authorized to query the data in cursor stability (CS) mode or higher isolation levels, all of the differences, some of which might be caused by rolled-back or in-flight transactions, are reported with 'U' for unknown for DIFF_PERSISTENCE column of the DIFF output table. The number of concurrent CS reads can be throttled by the parameter NUMTHREADS, which specifies the number of threads that the compare utility is allowed to create. Each CS read involves only one key value. In one embodiment, the maximum number of concurrent CS reads is equal to NUMTHREADS/3−1. In one embodiment, a parameter CS_READ=Y|N can be set to prevent the compare utility from issuing any SELECT statements under a CS isolation level which allows a shared lock to be placed on a fetched row, such that the shared lock is released when another row is fetched or the cursor is closed. The default CS value is Y (yes), which means fetching using CS isolation level is allowed. In one embodiment, differences reported as unknown are manually verified by doing CS mode queries after the compare utility invocation.

To efficiently re-compare detected differences, the compare utility persists the CRCs for each difference detected by recording the 64-bit checksum (CRC) for each difference that is detected, and adding this value to a new CCRC (compare-based checksum) column. After the persistence type of this difference is determined, the difference and the CCRC value is recorded into the DIFF output table. Each CCRC value is the concatenation of the 32-bit checksum (CRC) of the row at the source and the 32-bit checksum of the row at the target for the same key value. A CCRC uniquely identifies a difference.

Figure 8:
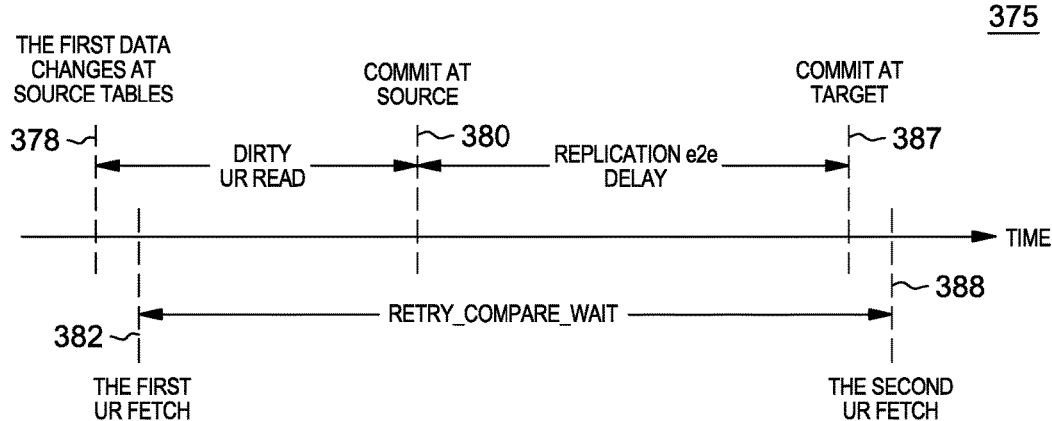
FIG. 8 is a timing diagram depicting how RETRY_COMPARE_WAIT time interval works with replication in one embodiment.

FIG. 8 shows one embodiment of a timing diagram 375 depicting use of the RETRY_COMPARE_WAIT time token as it is employed for replication. In the diagram 375, an initial data change at the source database table is depicted at 378. Asynchronous replication does not start capturing or replaying data changes until the transactions or changes are committed at source tables such as indicated at time 380 which time from the initial change represents a "dirty" UR read interval. For data fetches in UR data staleness that is caused by asynchronous replication is starting from initial data changes at source tables before issuing a commit, such as at 380, and ending at the corresponding data changes before issuing commits at target tables, such as at 387. Thus, replication delays, e.g., a replication end-to-end delay, should also include the whole time window of relevant transactions between a time of commit at the source table and until a corresponding commit at the target table. The RETRY_COMPARE_WAIT parameter represents the time duration depicted between the first UR fetch at 382 and a second UR fetch at 388, FIG. 8. The value of RETRY_COMPARE_WAIT should be set to a value greater than the replication delays.

Figure 9:
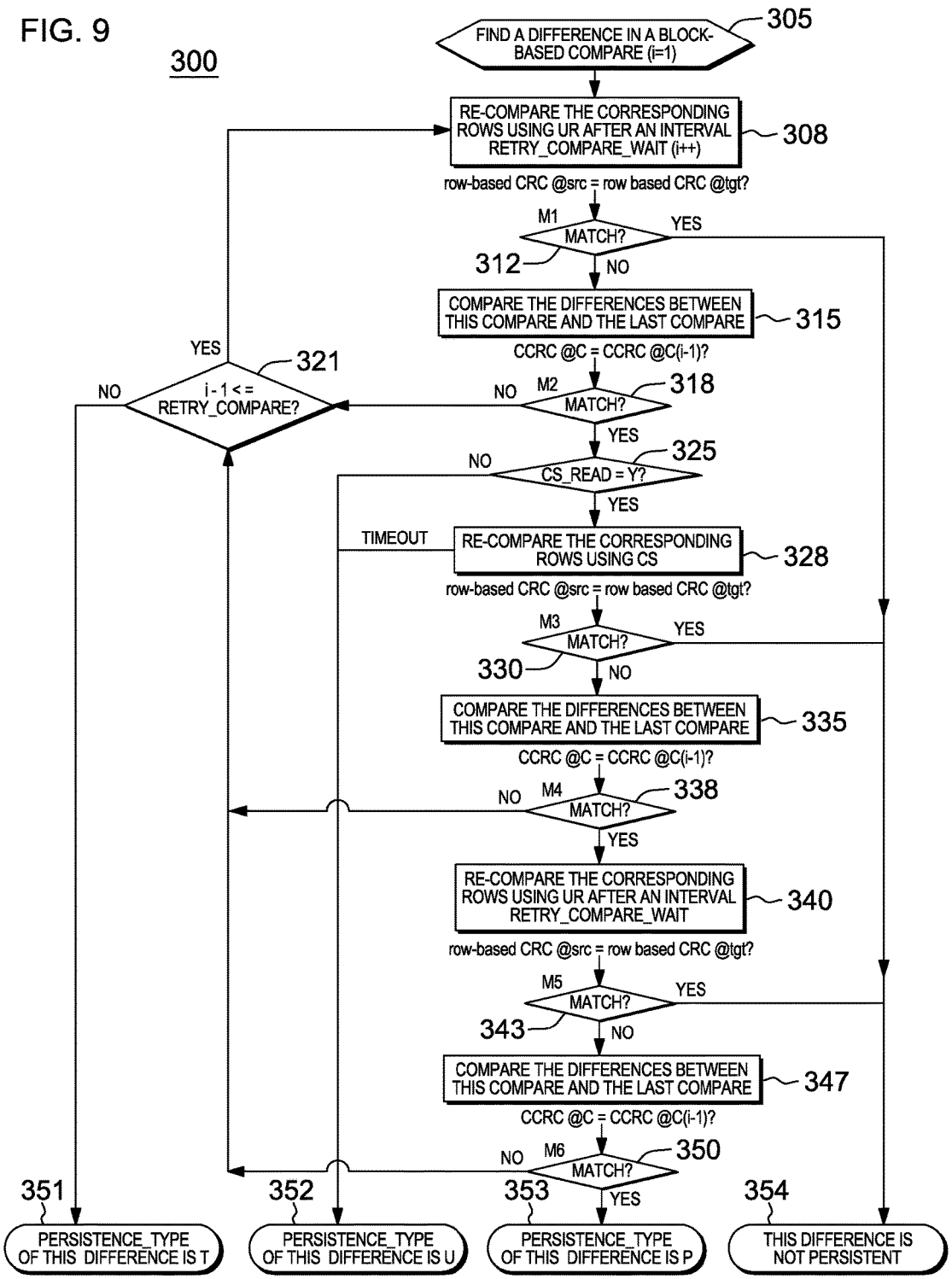
FIG. 9 shows a method for determining the persistence type for a specific difference in the live update environment in one embodiment.

FIG. 9 shows a method 300 for determining the actual persistence type of a specific difference with persistence type "doubtful". This determination can be conducted in a live update environment in one embodiment. In the embodiment depicted, the parameter RETRY_COMPARE_WAIT=n seconds, n is set with a default value of 1 second, for example, which value sets the time to wait by the compare utility before comparing the rows again for a difference.

Thus, at 305 a difference (i=1) is found by Merger thread, e.g., where i is an incrementable index indicating the number of difference comparisons that have been performed for that difference. The persistence type of that difference is marked as "doubtful".

The next step 308 performs re-comparing the corresponding row using UR after the time interval RETRY_COMPARE_WAIT has elapsed. Thus, after the delay, such as at time 388 of FIG. 8 the compare utility fetches the rows again in UR mode, re-computes the CRCs. This re-computation may invoke a function to determine whether the row-based CRC @ src==the row-based CRC @tgt for that row(s). The method further performs incrementing the index i by 1 indicating that a further re-compare has been performed.

At 312, if there is a match, i.e., it is determined that the CCRCs are identical, the same difference is still present. This difference is not a persistent difference as indicated at 354. This could result from a long running uncommitted transaction at the source, or because the effective replication delay was longer than RETRY_COMPARE_WAIT seconds.

Then, at 315, the method performs comparing the differences between the prior compare (in UR Mode) and the last comparison that was made. This re-computation may invoke a function to determine whether a new computed CCRC matches the CCRC in the memory, i.e., whether compare-based checksum CCRC @C==CCRC @C(i−1) for that row.

At 318, if there is no match, i.e., it is determined that the CCRCs difference exists between the current and prior compares match, the process proceeds to 321 where a further determination is made as to whether the current compare count i−1<=RETRY_COMPARE limit for the number of re-tries. If, at 321, it is determined that the number of retries limit has not been reached, i.e., i−1<=RETRY_COMPARE evaluates yes, then the process proceeds back to step 308 where a further re-comparison is made and the process steps after 308 repeat. Otherwise, if the number of retries limit has been reached, i.e., determining that current index i−1<=RETRY_COMPARE evaluates no, then it is determined that the persistence_type has timed out, i.e., is of value T. That is, a parameter, RETRY_COMPARE=n specifies how many times compare utility will re-compare rows that keep changing, before giving up, if the limit of compares has been reached and the rows are still different because the same row keeps been updated, the difference is reported as 'T' for Timed-out compare in the DIFF table.

Returning to step 318, if it is determined that there is a match, i.e., there is no difference in CCRCs between the current and prior compares match, then the process proceeds to step 325, FIG. 9, where the method determines whether the CS_READ parameter has been set to yes (Y), i.e., indicating CS isolation level (cursor stability) mode. If it is determined at 325 that the CS_READ parameter has been set to yes, then at 328, the rows are fetched again using CS or higher isolation level for re-comparison. Otherwise, at 325, if it is determined at 325 that the CS_READ parameter has not been set to yes, then it is determined that the persistence_type is unknown, i.e., is of value U.

Thus, with the rows being re-compared at 328, a determination is made at 330 whether the row-based CRC @src==the row-based CRC @tgt for that row(s). If there is a match, then it is determined that the difference was not a persistent one and given the indicator as NOT persistent at 354. Thus, if the rows are compared with CS and there is no difference, it means the difference was caused by an in-flight transaction that is now committed and replicated or the transaction was rolled back. Either way, the difference is gone.

Otherwise, at 330, if it is determined that there is no match between the row-based CRC @src==the row-based CRC @tgt for that row, then the process proceeds to step 335 where the compare-based checksum comparison again is made by comparing the differences between the prior compare (in UR Mode) and the last comparison, i.e., whether the compare-based checksum CCRC @C==CCRC @C(i−1).

Then, at 338, it is determined whether there is a match between the comparing the differences between the prior compare (in CS) and the prior (i−1) comparison. If there is determined no match, i.e., the relevant rows of this difference changed since the initial compare, then the process proceeds to step 321 where the determination is again made as to the current retry comparison level by evaluating the current value of i against the RETRY_COMPARE parameter. Depending upon this evaluation at 321, the process may proceed to step 308 for a further re-comparison under UR, or in case the RETRY_COMPARE limit has been reached, proceeds to step 351 where the persistence_type is indicated at T (timeout).

If, at 338, the compare-based checksum CCRC @C==CCRC @C(i−1) results in a match, the process proceeds to step 340 where, the compare utility fetches the rows again in UR mode after the interval RETRY-COMPARE_WAIT, re-computes the CRCs, and compares the new CCRC with the CCRC in the DIFF table. This re-computation may invoke a function to determine whether the row-based CRC @src==the row-based CRC @tgt for that row(s).

If, at 343, it is determined that there is a match, then it is determined that the difference was not a persistent one and this difference is given the indicator as NOT persistent at 354. However, if it is determined at 343 that there is no match, the process proceeds to step 347 where again the comparison of the differences between the compare and the last compare is made, i.e., whether the compare-based checksum CCRC @C==CCRC @C(i−1) results in a match.

Proceeding to 350, if it is determined that compare-based checksum CCRC @C==CCRC @(i−1) results in no match, then the process proceeds back to step 321 where the determination is again made as to the current retry comparison level by evaluating the current value of i against the RETRY_COMPARE parameter. Depending upon this evaluation at 321, the process may proceed to step 308 for a further re-comparison under UR, or in case the RETRY_COMPARE limit has been reached, proceeds to step 351 where the persistence_type is indicated at T (timeout).

Otherwise, if it is determined at 350 that compare-based checksum CCRC @C==CCRC @(i−1) does result in a match, then the process proceeds to 353 where the persistence type for this difference is indicated as persistent (P).

Thus, as indicated at step 328 and 340, when compared with CS, and with the CCRCs being determined as identical, it means the source transaction was finally committed but have not yet been replicated. The row is thus re-compared in UR mode after RETRY_COMPARE_WAIT seconds up to RETRY_COMPARE limit.

Further, as indicated at step 318 and 338, if when compared with CS, and the newly computed CCRC is different (do not match), the rows are different but with different values from last time, indicating, for example, that the row might have been updated again at the source and not yet replicated to the target. The data is compared again after the replication delay has elapsed in UR mode at 340.

Although not shown, each difference in the DIFF table has DIFF_TIME timestamp, which is the time the data was fetched for the last compare. A user can correlate the DIFF_TIME with MONITOR_TIME. If the END2END_LATENCY was excessive at that time, i.e., longer than the total retry time, then the difference was because the row still had not been replicated. One can either run compare utility again, or manually select the rows to compare them.

In one embodiment, a further parameter, RECHECK_DIFFS=diff-schema-name.diff-table-name may be used to re-compare only the rows that were reported as differences in the former DIFF output table.

Figure 10:
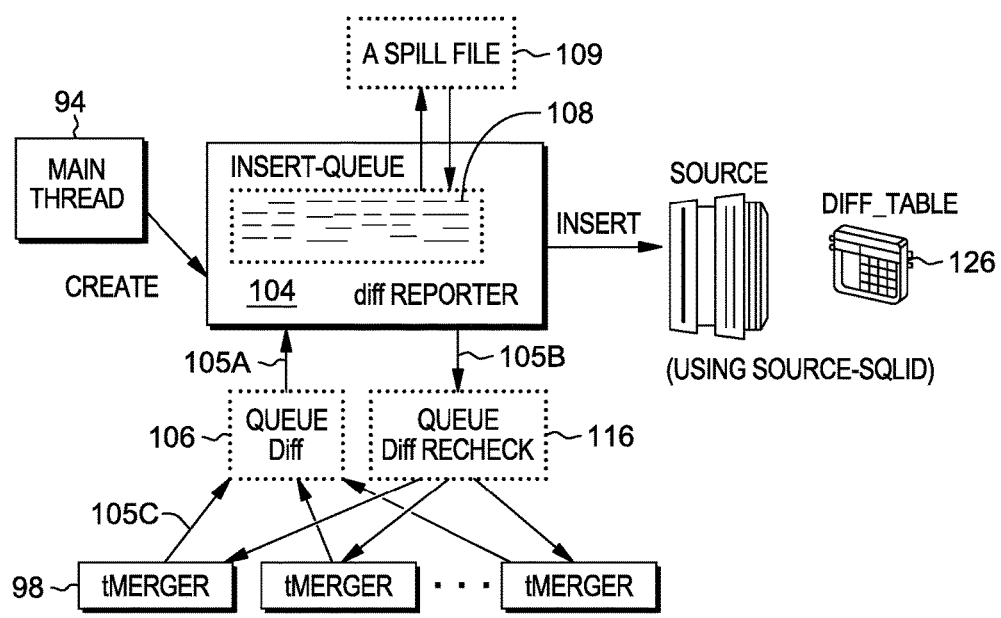
FIG. 10 depicts a system for making a determination of the persistent differences as described herein.

FIG. 10 depicts a system 400 for making a determination of the persistent differences as described herein. In one embodiment, a difference is persistent, if the data is still different when re-checked after the replication delay and the difference was not initially caused by uncommitted transactions when the data was first compared. The persistence-type values are determined in the diffReporter thread 104. In a first difference unloading stage, in view of FIG. 10, a QueueDiff 106 is a synchronized queue for sending the differences from the Merger merger threads to the diffReporter. A Merger thread 98 computes the CCRC and determines the persistence type such as described herein with respect to FIG. 9. The initial persistence type of all the identified differences is 'D' (Doubtful). A 'D' difference (persistence type) 105A is read from QueueDiff 106 immediately when a Merger thread posts a detected difference. This is row-based notification. The diffReporter 104 stores the differences in a local private queue, the Insert_Queue 108. In one embodiment, a spill file 109 is created when the maximum allowable memory space is not large enough to hold all the differences in the Insert_Queue 108.

A second persistent difference identification stage, in view of FIG. 10, begins after the RETRY_COMPARE_WAIT seconds from the DIFF_TIME time stamp of the differences indicated in the Insert_Queue 108. The diffReporter 104 inserts each difference 105B into a synchronized queue, QueueDiffRecheck 116. This queue 116 is consumed by a pool of Merger threads 98. For each difference 105B processed, a Merger thread will send the re-check result 105C (persistence type) back to the diffReporter via QueueDiff 106.

A third persistent difference reporting stage, in view of FIG. 10, begins when the diffReporter thread 104 reports the differences that are detected by the Merger threads 98. The diffReporter thread 104 keeps reading QueueDiff, and inserts into the DIFF table 126, differences whose persistence type can be determined (i.e., whose difference type is 'U' (Unknown), 'T' (Timeout) or 'P' (Persistent)). The detailed determination method has been explained in FIG. 9. Differences with persistence type 'D' (Doubtful), are inserted into the Insert_Queue 108 for further compare by the Mergers; differences with type 'N' (Non-persistent), are ignored. Only the type 'P', 'T' and 'U' are externalized to users. To determine the actual persistence, the type 'U' in DIFF output table requires additional compares using CS and the type 'T' in DIFF output table requires more re-compares using UR.

In one embodiment, the utility employs a progress monitoring function. In this embodiment, a parameter value for JOBPROGRESSPERCT=Y|N may be set (to No) and used to eliminate the step of counting rows. Thus, the output message, example messages 150 of which are shown in FIG. 12, would not show the percentage of completion indicated at 153 and the percentage of start indicated at 155. Instead, the percentage values are replaced with only the number of completed rows and the number of comparing/compared rows for reporting (e.g., "Completed 10000 rows Start 15000 rows"). Both non-live mode and live mode can report the completion of a block-based compare when their block-based checksums match. If not matched, non-live mode can get the results after one-pass row-based compare, but live mode requires multiple-pass row-based compare with at least one RETRY_COMPARE_WAIT interval. Thus, in order for the compare progress in live mode to not appear stale or even hanging the system also reports at 155 a percentage or row counts of block-based compare start. A block-based compare is viewed as "start" after initial block-based stats/data fetch are compared. The example message 150 shown in FIG. 12 depicts the block-based compare message as having a percentage or row counts of block-based compare start 155. A block-based compare is viewed as "start" after an initial block-based stats/data fetch compare.

After completion of a block, a block-specific compare status is changed. A compare of a specific block is completed if and only if the persistence types of all these rows have been determined. Multiple blocks could also be compared at the same time. A hash table may be used in one implementation for tracking the entire compare process of a specific block. When the first difference with persistence type 'D' is sent to diffReporter after initial UR compares, the block is inserted into the hash table. When the persistence types of all these doubtful differences are determined, the block is removed from the hash table.

In addition, all the associated differences are inserted and committed before the block status in the hash-based block status table changes. Also, in one embodiment, to avoid frequent or huge commits, inserted differences are committed when one block is completed, or a number of differences is a multiple of some number, e.g., 50.

In one embodiment, in view of FIG. 10, the overall performance is improved after removing counting rows in the initial pre-processing stage performed by the Main thread 94. However, when JOBPROGRESSPERCT=Y, counting rows at the source is still required. This task is assigned to the diffReporter thread 104, i.e., a potential bottleneck is introduced to diffReporter thread in the initial stage of a Live compare. If counting is not completed, diffReporter 104 is unable to start processing the differences reported from the Merger threads. When the number of type-'D' difference is larger than the size of diffQueue 106, Merger threads 98 will be blocked until the diffQueue is not full or an diffQueue of unlimited memory storage becomes available. In one example, a current hard-coded value is 10,000.

Further details regarding the making of a determination to fetch data with cursor stability (CS) is now described with respect to an embodiment. When binding the stored procedures and associated common packages, the variable UR (Uncommitted Read) is used as the isolation level for data access. The higher the isolation level, the more locks the database (e.g., DB2) must acquire, with the potential impact of slowing down other applications or causing deadlock situations. For avoiding the differences caused by a "dirty" read, data is fetched using the isolation level CS (Cursor Stability) by explicitly stating the clause "WITH CS" as part of the SQL statement. The CS cursor used for data fetching is using the multi-row fetch with "FOR READ ONLY". The compare utility does not retry the query statement after receiving a negative SQLCODE. The utility will release the lock by commits and then report the difference with persistence type 'U' when an error code indicates one of: 1) that the current unit of work has been rolled back due to deadlock or timeout, a ROLLBACK statement is issued on behalf of the application process. All updates during the current unit of work have been undone; or 2) that unsuccessful execution caused by deadlock or timeout, a ROLLBACK statement is not issued, but, in case of deadlock, the application process itself is requested either to issue a ROLLBACK statement or to terminate.

The amount of time that the compare utility will wait for a specific lock for the CS read at 328 in FIG. 9 before timing out is controlled by other DBMS variables For example, on IBM DB2 z/OS, the maximum length of time the compare will wait for the lock before it times out would be the IRLMRWT DSNZPARM value plus the DEADLOCK IRLM PROC value.

An example database system (IBM DB2) running on a server platform, e.g., on IBM's z/OS, has a PREPARE clause USE CURRENTLY COMMITTED to access the version of data that was last committed (that is, the version of data that existed before the "blocking" unit-of-work has changed the row but has not yet committed the change), instead of waiting for writers to release locks. This can improve the performance of read-only applications, such as, the table compare utility. The utility can obtain the committed data when data is in the process of being updated and deleted (rows that are in the process of being inserted are skipped). Unfortunately, as not all database option on DB2 z/OS support the UPDATE operations, thus, the CS read transaction must wait for a COMMIT or ROLLBACK operation for any blocking UPDATES. DB2 LUW supports the concurrent access to the previous version of data that was last committed when UPDATE operations are being conducted. In one embodiment, a WAIT FOR OUTCOME behavior is used instead under the following conditions: When the tablespace on which the package operates is not a universal table space, the USE CURRENTLY COMMITTED is only applicable to universal tablespace; for table, partition, or table space locks; for when LOCK TABLE IN EXCLUSIVE MODE is used; when the lock holder is performing mass delete; and if the lock holder has escalated.

In an example embodiment in which a DB2 database is implemented, locking behavior is controlled by parameters that are defined on the table space. Improper parameter values can cause frequent resource unavailability and low concurrency. LOCKSIZE, LOCKMAX and MAXROWS are such three parameters: The LOCKSIZE PAGE parameter is one choice for performance and concurrency. To achieve the concurrency of row-level locking without increased data sharing overhead, use of MAXROWS 1 may be used to force each row to its own page. MAXROWS 1 increases the number of pages required to store the data and eliminates all benefits of compression.

For achieving high availability, there is no reason to allow lock escalations to occur. The benefit of lock escalation is a safeguard by DB2 in reducing a large number of locks held in the IRLM on behalf of poorly designed applications that are not releasing their locks. Thus, in one embodiment, a LOCKMAX=0 value may be set to avoid lock escalation.

A further NUMLKTS subsystem parameter (the LOCK PER TABLESPACE field) specifies the default value (at the subsystem level) for the LOCKMAX clause of CREATE TABLESPACE and ALTER TABLESPACE statements. The value for the LOCKMAX should be less than the NUMLKUS subsystem parameter (the LOCK PER USER field). Exceeding either limit can cause the resource unavailable condition. When compare utility causes the resources unavailable condition, the value of CS_READ parameter should be first set to 'N' and then investigate the root cause.

In an example implementation, Mergers thus have two duties: 1) compare each block and send any suspicious difference candidates to diffReporter; and 2) recheck suspicious differences (sent from diffReporter) one by one and phase by phase. In the live-mode compare, block-based initial compare might find many row-based suspicious differences. The suspicious differences in a few continuous blocks may be a lot and engender a performance concern. To resolve this performance concern, as shown in the system diagram 410 of FIG. 11, there is provided special-purpose Mergers referred to as "dMergers" 398 that are only for the re-checking of individual differences as indicated as created dMerger threads block 399. Since these dMergers 398 do not compare table blocks, they will not increase usage but rather improve the performance.

Figure 11:
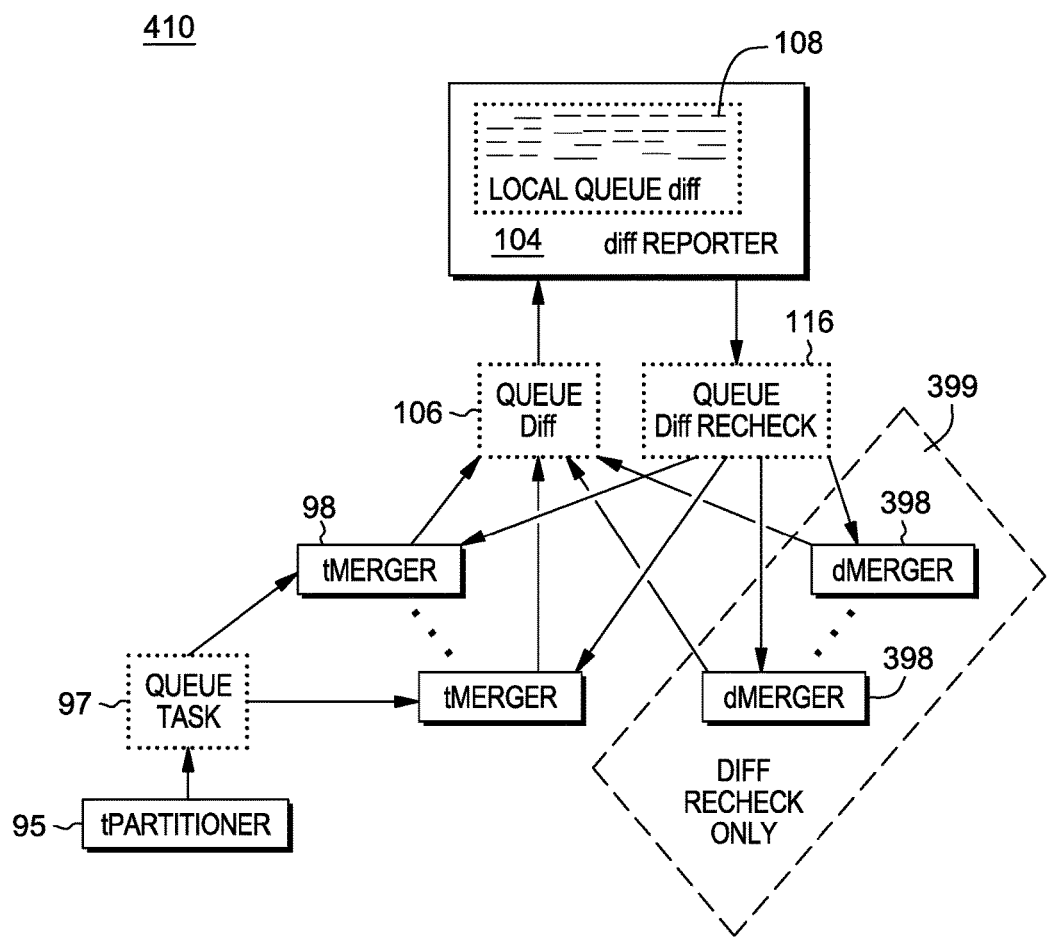
FIG. 11 depicts a system for making a determination of the persistent differences that employs the use of special-purpose processing threads that are only dedicated to perform the re-checking of individual differences.

Thus, as an example, in FIG. 11, when users input "LIVE=Y, NUMTHREADS=21, another PARALLELC-MPS=2", the compare utility will create 2 Mergers (2*3), each of which will create 2 Worker threads, 1 diffReporter thread 104, 1 Partitioner thread 95, 1 Main thread 94. Given the limit on the number of threads (e.g., 21) in this example, there would still be created 21−9=12 threads. Using all these threads, 4 more diff-recheck-only Mergers threads 398 may be created transparent to users.

In a further exemplary embodiment, reference is had to FIG. 13 showing the results of implementing the detailed procedures of difference detection. For example, users can obtain the whole procedure from the difference table. In one embodiment, the detailed procedure and result will report the duplicate differences if and only if the differences are the rows with the same key values that are assigned to difference blocks.

Thus, a difference detection output table 160 shown in FIG. 13, is provided having data field columns: e.g., data fields column 163 indicating for a block number (indicated in a Block_Num column field 166); and the key columns used to identifies the relevant rows (e.g., this table has a one-column key ID field 167); a corresponding Difference type (Diff_Type) for the relevant rows and having one of three types: U (Update), D (Delete) and I (Insert); and a column 165 indicating the block's persistent state (DIFF_IS_PERSISTENT) values, e.g., P (Persistent), U (Unknown), T (Timeout) and D (Doubtful) or Non-Persistent (N); a computed CCRC value in field 162 and its corresponding timestamp value 161. As shown in the example output 160 of FIG. 13, all the first five rows are the candidate differences after the first compare. The block ID is the key column. One row 168, in particular, does not indicate a detected difference and is not a difference but a signal from Merger to diffReporter that block 1 is completed. The key values will be NULL. Further, in the example output 160, the rows 169 show the differences after a Committed Read, e.g., after a third compare, with Persistence field values indicated as "C" (committed). The last five rows 170 of the output show the differences that are persistent, with Persistence field values indicated as "P".

When the detailed difference detection is not necessary, the compare utility does not report the difference detection procedure. Instead, only the final results for each difference are reported. That means, only the difference with persistence type P (Persistent), U (Unknown) and T (Timeout) are reported and inserted into the output DIFF table.

In a further embodiment, after all the compares are completed, the diffReporter thread may be configured to report the statistics in difference detection as shown in FIG. 14 providing the totals 175 including: the total number of rows fetched from source tables; the total number of differences (including all DIFF_IS_PERSISTENT values T, U, P); the total number of duplicated differences; the total number of differences having DIFF_TYPE=U (with different non-key columns); the total number of rows having DIFF_TYPE=I (Insert) type (source only); the total number of rows having DIFF_TYPE=D (Delete) type (target only); the total number of CS reads; the total number of rows whose DIFF_PERSISTENCE is a value T (timeout); the total number of rows whose differences are not persistent differences after recompares; the total number of rows whose differences DIFF_PERSISTENCE is a value P (Persistent); the total number of rows whose differences DIFF_PERSISTENCE is a value U (Unknown); and, the total number of recompares (whose value does not count the initial compares).

Figure 3:
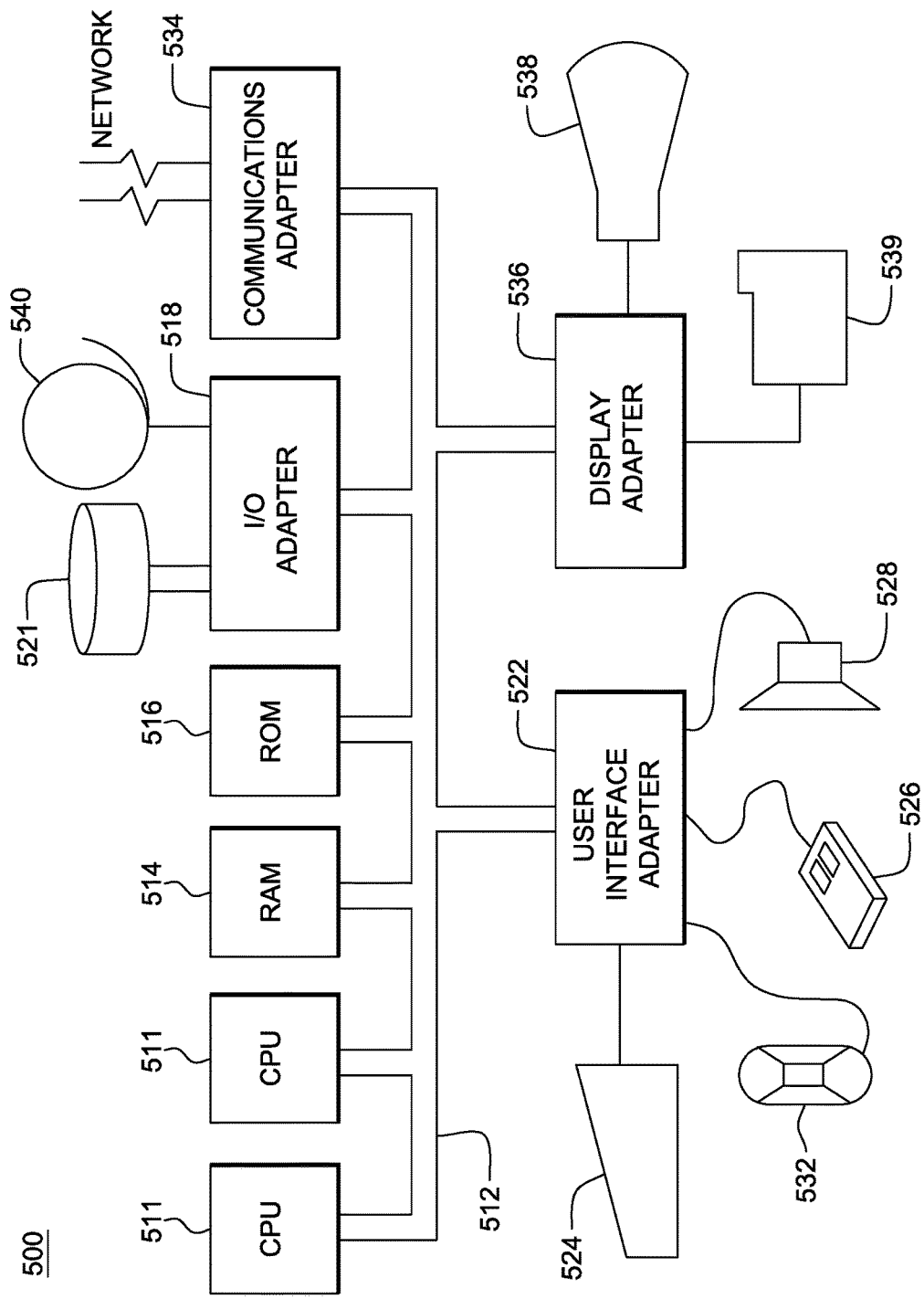
FIG. 3 depicts an exemplary hardware configuration for performing the methods described herein.

FIG. 3 illustrates one embodiment of an exemplary hardware configuration of a computing system 500 programmed to perform the method steps of FIGS. 4A-7 and 9 for implementing lightweight table comparison and persistent differences identification of as described herein with respect to FIGS. 4A-4B, 5-7 and 9. The hardware configuration preferably has at least one processor or central processing unit (CPU) 511. The CPUs 511 are interconnected via a system bus 512 to a random access memory (RAM) 514, read-only memory (ROM) 516, input/output (I/O) adapter 518 (for connecting peripheral devices such as disk units 521 and tape drives 540 to the bus 512), user interface adapter 522 (for connecting a keyboard 524, mouse 526, speaker 528, microphone 532, and/or other user interface device to the bus 512), a communication adapter 534 for connecting the system 500 to a data processing network, the Internet, an Intranet, a local area network (LAN), etc., and a display adapter 536 for connecting the bus 512 to a display device 538 and/or printer 539 (e.g., a digital printer of the like).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of table data comparison comprising:

identifying, using a hardware processor of a first computing system, a block comprising a sub-set of rows of data of a source database table having a plurality of blocks, and identifying, using a hardware processor of a second computing system, a corresponding block comprising sub-set of rows of data of a second database table having a plurality of blocks;

obtaining, using the hardware processor of the first computing system, a statistical value associated with data included in the identified block of the source table, and obtaining, using the hardware processor of the second computing system, a further statistical value of the data included in the corresponding block of the target table block;

comparing, using the hardware processor of either said first or second computing system, the statistical values to determine a matching comparison result, and determining, using the hardware processor of either said first or second computing system, based on a result of said comparing, whether the block of each source and target database table is consistent, wherein, upon determining a non-matching comparison result using the hardware processor of the either first or second computing system, fetching each said identified and corresponding block and further comparing on a row-by-row comparison summary data of rows in said identified block and corresponding block for a consistency determination; or upon determining a matching comparison result, avoiding the fetching of the data from said blocks to perform a row-by-row comparison of said identified and corresponding block, and upon determining the matching comparison result using the hardware processor of the either first or second computing system, using the hardware processor of the first computing system and the hardware processor of the second computing system to identify and obtain a further block from said respective source database table and target database table and repeat, using the hardware processor of the either first and second computing system, said comparing and consistency determining for said further block, and using the hardware processor of the first computing system and the hardware processor of the second computing system to repeat said identifying and obtaining for a plurality of blocks, and repeat, using the hardware processor of the either first and second computing system, said comparing and consistency determining for the plurality of blocks.

2. The method of claim 1, wherein the identifying of a block comprises identifying a materialized query table view defining a sub-set of rows formed as a result of prior applying user database query operations.

3. The method of claim 1, wherein the identifying of a block comprises identifying rows of said source database table selected via a sampling operation.

4. The method of claim 3, wherein the sampling operation employs a random selection function.

5. The method of claim 1, wherein said obtaining a statistical value comprises one or more of:
   employing a process to collect a statistic, a statistic comprising a row count (cardinality) value of said block or table, a column count value of said block or table, an average row length value of said block or table, a cardinality and a histogram of statistics, a keys cardinality value, a specified summary value generated on one or multiple columns of said block to table, a specified average value generated on one or multiple columns of said block to table, a specified standard deviation value generated on one or multiple columns of said block to table; and
   employing a user defined function to process said data in said block to compute a statistics value.

6. The method of claim 1, run in a database environment where the target database table includes data replicated from the source table, said method further comprising:
   determining a first set of differences between rows of the identified block from the source table and the rows of the corresponding block from the target table at a first point in time;
   determining a second set of differences between rows of the block from the source table and the rows of the block from target table at a second point in time subsequent to the first point in time by at least a replication latency interval,
   determining a difference between the identified block of said source table and corresponding block of said target table as being one of: a persistent type, not-persistent type, timed-out type, or unknown type, based on said first set and second sets of differences from different points in time.

7. The method of claim 6, further comprising:
   determining entry into an uncommitted read (UR) isolation level mode of operation permitting querying data to avoid contention for locks with one or more user applications, and
   if entry in said UR mode is determined, and a current time is after a replication latency time interval,
   re-comparing the summary data values for the data of a corresponding row in a corresponding blocks of said source and target tables, and if said re-compared summary data values for the row is determined as matching, said difference type is not persistent; otherwise,
   if said re-compared summary data values difference is determined as not-matching,
   comparing a current determination difference result and a difference determination result for that row occurring from a prior latency time interval; and if said compared difference between the current difference result and prior difference result is determined as matching:
   determine whether said difference result for said row has been evaluated under a cursor stability (CS) isolation level mode of operation that permits a shared lock to be placed on a fetched row, and permits another process to place a shared lock on the same row, and if not operating under the CS level mode of operation, determining said difference type as unknown;
   and if said compared difference between the current difference result and prior difference result is determined as matching, determining said difference type as persistent.

8. The method of claim 7, wherein if said compared current determination difference result and the prior difference determination result for that row is determined as non-matching:
   repeating, for a specified number of iterations, said re-comparing the summary data values for corresponding rows of a block from said source table and target table in said UR mode until a matching condition is detected; and if no matching condition is detected, in the same iteration:
   repeating the comparing of the current determination difference result and the prior difference determination result for that row, and
   if the non-matching condition difference result is maintained after said number of iterations is reached, determining said persistence type as timed out.

9. The method of claim 1, wherein the first and second computer systems are separated over a communications network.

10. The method of claim 9, wherein to determine a matching comparison result, said comparing is performed using a hardware processor of a third computing system remote from said first and second computer systems and in communication with the first and second computer systems over a communications network.

11. A system for table data comparison comprising:
   a memory storage device associated with a hardware processor of a computer system configured to store data received from a source database table and store corresponding data received from a target database table, both the source database table and the target database table comprising a plurality of blocks;
   the hardware processor of the computer system in communication with said memory, the processor configured to perform a method to:
   identify a block comprising a sub-set of rows of data of a source database table, and a corresponding block comprising sub-set of rows of data of a second database table;
   obtain a statistical value associated with data included in the identified block of the source table, and obtain a further statistical value of the data included in the corresponding block of the target table block;
   compare the statistical values to determine a matching result, and
   determine, based on a result of said comparing, whether the block of each source and target database table is consistent wherein,
   upon determining a non-matching comparison result, said hardware processor is further configured to:
   fetch each said identified and corresponding block and further compare on a row-by-row comparison summary data of rows in said identified block and corresponding block for a consistency determination; or upon determining a matching comparison result, said hardware processor is further configured to: avoid the fetching of the data from said blocks to perform a row-by-row comparison of said identified and corresponding block, and upon determining the matching comparison result, said hardware processor is further configured to:

identify a further block from said source and target database tables and repeat said obtaining, comparing and consistency determining for said further block, and repeat said identifying, obtaining, comparing and consistency determining for a plurality of blocks.

12. The system of claim 11, wherein a block comprises a materialized query table view defining a sub-set of rows formed as a result of prior applying user database query operations.

13. The system of claim 11, wherein said hardware processor is further configured to: perform a sampling operation to identify rows for said block.

14. The system of claim 13, wherein the sampling operation employs a random selection function.

15. The system of claim 11, wherein to obtain a statistical value, the hardware processor is further configured to one or more of:

employ a process to collect a statistic, a statistic comprising a row count (cardinality) value of said block or table, a column count value of said block or table, an average row length value of said block or table, a cardinality and a histogram of statistics, a keys cardinality value, a specified summary value generated on one or multiple columns of said block to table, a specified average value generated on one or multiple columns of said block to table, a specified standard deviation value generated on one or multiple columns of said block to table; and employing a user defined function to process said data in said block to compute a statistics value.

16. The system of claim 11, wherein the target database table includes data replicated from the source table, said processor device is further configured to:

determine a first set of differences between rows of the identified block from the source table and the rows of the corresponding block from the target table at a first point in time;

determine a second set of differences between rows of the block from the source table and the rows of the block from target table at a second point in time subsequent to the first point in time by at least a replication latency interval, determine a difference between the identified block of said source table and corresponding block of said target table as being one of: a persistent type, not-persistent type, timed-out type, or unknown type, based on said first set and second sets of differences from different points in time.

17. The system of claim 16, wherein said processor device is further configured to:

determine an entry into an uncommitted read (UR) isolation level mode of operation permitting querying data to avoid contention for locks with one or more user applications, and if said UR mode is entered, and a current time is after a replication latency time interval, re-compare the summary data values for the data of a corresponding row in a corresponding blocks of said source and target tables, and if said re-compared summary data values for the row is determined as matching, said difference type is not persistent; otherwise, if said re-compared summary data values difference is determined as not-matching, compare a current determination difference result and a difference determination result for that row occurring from a prior latency time interval; and if said compared difference between the current difference result and prior difference result is determined as matching:

determine whether said difference result for said row has been evaluated under a cursor stability (CS) isolation level mode of operation the permits a shared lock to be placed on a fetched row, and that permits another process to place a shared lock on the same row, and if not operating under the CS level mode of operation, determining said difference type as unknown, and if said compared difference between the current difference result and prior difference result is determined as matching, determining said difference type as persistent.

18. The system of claim 17, wherein if said compared current determination difference result and the prior difference determination result for that row is determined as non-matching, said processor device is further configured to:

repeat, for a specified number of iterations, said re-comparing the summary data values for corresponding rows of a block from said source table and target table in said UR mode until a matching condition is detected; and if no matching condition is detected, in the same iteration:

repeating the comparing of the current determination difference result and the prior difference determination result for that row, and if the non-matching condition difference result is maintained after said number of iterations is reached, determining said persistence type as timed out.

19. The system of claim 11, wherein the source database table resides in memory associated with a first computer system and said target database table resides in memory associated with a second computer system, said first and second computer systems are separated over a communications network.

20. The system of claim 19, wherein said computer system is a third computer system remote from said first and second computer systems and in communication with the first and second computer systems over a communications network.

* * * * *